United States Patent
Shikii et al.

(10) Patent No.: US 11,536,480 B2
(45) Date of Patent: Dec. 27, 2022

(54) AIR CONDITIONER, SENSOR SYSTEM, AND THERMAL SENSATION ESTIMATION METHOD

(71) Applicant: Panasonic Corporation, Osaka (JP)

(72) Inventors: Shinichi Shikii, Nara (JP); Koichi Kusukame, Nara (JP); Hiroko Kubo, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 523 days.

(21) Appl. No.: 15/171,885

(22) Filed: Jun. 2, 2016

(65) Prior Publication Data

US 2016/0363340 A1 Dec. 15, 2016

(30) Foreign Application Priority Data

Jun. 10, 2015 (JP) .............................. JP2015-117775

(51) Int. Cl.
*F24F 11/30* (2018.01)
*F24F 11/62* (2018.01)
(Continued)

(52) U.S. Cl.
CPC .......... *F24F 11/62* (2018.01); *B60H 1/00742* (2013.01); *F24F 11/30* (2018.01);
(Continued)

(58) Field of Classification Search
CPC .. F24F 11/62; F24F 11/30; F24F 11/63; F24F 2120/10; F24F 2130/20; F24F 2120/12;
(Continued)

(56) References Cited

U.S. PATENT DOCUMENTS 5,291,748 A 3/1994 Ueda
5,384,716 A * 1/1995 Araki ................... F24F 11/0009
374/112

(Continued)

FOREIGN PATENT DOCUMENTS

JP 5-193338 A 8/1993
JP 6-180139 A 6/1994
(Continued)

OTHER PUBLICATIONS

De Dear, R.J., Arens, E., Hui, Z. and Oguro, M., 1997. Convective and radiative heat transfer coefficients for individual human body segments. International Journal of Biometeorology, 40(3), pp. 141-156. (Year: 1997).*

(Continued)

*Primary Examiner* — Alicia M. Choi
(74) *Attorney, Agent, or Firm* — Greenblum & Bernstein, P.L.C.

(57) ABSTRACT

The air conditioner includes a thermal image acquirer that acquires a thermal image indicating a temperature distribution inside the air-conditioned space, and a thermal sensation estimator that estimates the thermal sensation of a person in the air-conditioned space based on the thermal image obtained from the thermal image acquirer and a parameter set in the air conditioner, the parameter prescribing at least one of a wind direction, a wind speed, and a wind temperature of wind emitted from the air conditioner.

20 Claims, 21 Drawing Sheets

(51) Int. Cl.
- *B60H 1/00* (2006.01)
- *F24F 110/10* (2018.01)
- *F24F 120/10* (2018.01)
- *F24F 11/63* (2018.01)
- *F24F 120/12* (2018.01)
- *F24F 130/20* (2018.01)

(52) U.S. Cl.
CPC .......... *F24F 11/63* (2018.01); *F24F 2110/10* (2018.01); *F24F 2120/10* (2018.01); *F24F 2120/12* (2018.01); *F24F 2130/20* (2018.01); *F24F 2221/38* (2013.01)

(58) Field of Classification Search
CPC .............. F24F 2110/10; F24F 2221/38; B60H 1/00742
USPC ........................................................ 700/276
See application file for complete search history.

(56) References Cited

U.S. PATENT DOCUMENTS

| | | | | |
|---|---|---|---|---|
| 5,449,275 | A * | 9/1995 | Gluszek | F04D 27/001 417/18 |
| 6,021,956 | A * | 2/2000 | Haraguchi | B60H 1/00742 236/51 |
| 2005/0284158 | A1* | 12/2005 | Lee | F24F 11/30 62/331 |
| 2009/0216482 | A1* | 8/2009 | Baker | G01W 1/17 702/136 |
| 2012/0123732 | A1* | 5/2012 | Matsumoto | F24F 11/30 702/135 |
| 2012/0232715 | A1* | 9/2012 | Vass | G01W 1/17 702/130 |
| 2014/0138043 | A1* | 5/2014 | Matsumoto | F24F 11/523 165/11.1 |
| 2014/0148706 | A1* | 5/2014 | Van Treeck | A61B 5/015 600/474 |
| 2014/0334519 | A1* | 11/2014 | Antonini | G01K 1/143 374/124 |
| 2014/0369805 | A1* | 12/2014 | Park | F24F 11/30 415/118 |
| 2015/0028114 | A1* | 1/2015 | Rosen | F24F 11/0034 236/51 |
| 2015/0204556 | A1* | 7/2015 | Kusukame | F24F 11/30 165/237 |
| 2016/0109148 | A1* | 4/2016 | Honda | G01J 5/10 702/135 |
| 2016/0178440 | A1* | 6/2016 | Uno | G01J 5/0025 356/43 |
| 2016/0187022 | A1* | 6/2016 | Miwa | G01V 8/10 250/349 |
| 2016/0320081 | A1* | 11/2016 | Nikovski | F24F 11/30 |
| 2018/0073761 | A1* | 3/2018 | Iuchi | G06T 7/70 |

FOREIGN PATENT DOCUMENTS

| | | | | |
|---|---|---|---|---|
| JP | 06180139 A | * | 6/1994 | ............. F24F 11/02 |
| JP | 7-172141 A | | 7/1995 | |
| JP | 2005-138793 | | 6/2005 | |
| JP | 2007-001464 A | | 1/2007 | |
| JP | 2019085037 A | * | 6/2019 | |
| KR | 20090091527 A | * | 8/2009 | ............. F24F 11/02 |
| KR | 20110020065 A | * | 3/2011 | ............. F24F 11/02 |

OTHER PUBLICATIONS

McNeill, Marc B., Parsons, Ken C., 2008. The effects of solar radiation on human thermoregulatory system: Experimental investigation into thermal strain caused by solar radiation. Department of Human Sciences, Loughborough University, LE11 3TU, UK. (Year: 2008).*

Murakami, S., Kato, S. and Zeng, J., 2000. Combined simulation of airflow, radiation and moisture transport for heat release from a human body. Building and environment, 35(6), pp. 489-500. (Year: 2000).*

* cited by examiner

WIND SPEED 1 m/s

WIND SPEED 2 m/s

AIR CONDITIONER, SENSOR SYSTEM, AND THERMAL SENSATION ESTIMATION METHOD

BACKGROUND

1. Technical Field

The present disclosure relates to an air conditioner that conducts air conditioning control of an air-conditioned space, a sensor system, and a thermal sensation estimation method.

2. Description of the Related Art

An air conditioner that estimates a thermal sensation from the surface temperature of a person and conducts air conditioning control of an air-conditioned space on the basis of the estimated thermal sensation has been disclosed (for example, see Japanese Unexamined Patent Application Publication No. 2005-138793).

SUMMARY

In one general aspect, the techniques disclosed here feature an air conditioner that conducts air conditioning control of an air-conditioned space based on a thermal sensation of a person in the air-conditioned space. The air conditioner includes a thermal image acquirer that acquires a thermal image indicating a temperature distribution inside the air-conditioned space, and a thermal sensation estimator that estimates the thermal sensation of the person in the air-conditioned space based on the thermal image obtained from the thermal image acquirer and a parameter set in the air conditioner, the parameter prescribing at least one of a wind direction, a wind speed, and a wind temperature of wind emitted from the air conditioner, and a controller that conducts air conditioning control of the air-conditioned space based on the thermal sensation of the person in the air-conditioned space.

It should be noted that general or specific embodiments may be implemented as a system, a method, an integrated circuit, a computer program, a storage medium, or any selective combination thereof.

According to the present disclosure, technology such as an air conditioner able to estimate a person's thermal sensation more accurately may be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
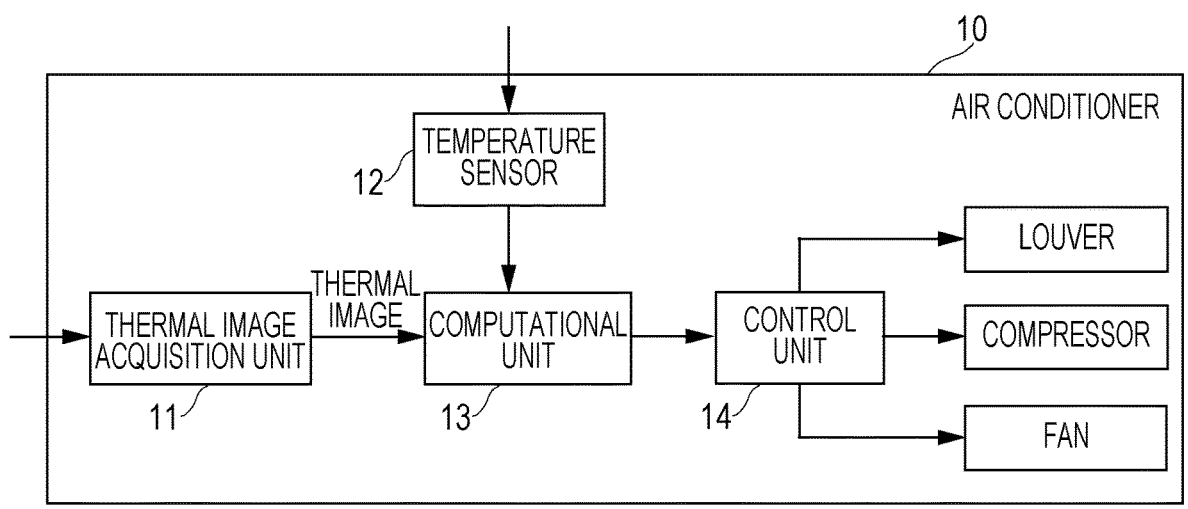
FIG. 1 is a diagram illustrating an example of a configuration of an air conditioner according to Embodiment 1.

Underlying Knowledge Forming Basis of the Present Disclosure

With the technology disclosed in Japanese Unexamined Patent Application Publication No. 2005-138793, a thermal sensation indicating whether a person perceives the temperature to be hot or cold is merely estimated from the surface temperature of a person in an air-conditioned space. In other words, with the technology disclosed in Japanese Unexamined Patent Application Publication No. 2005-138793, a person's thermal sensation cannot be estimated accurately. For this reason, in the air conditioner described in Japanese Unexamined Patent Application Publication No. 2005-138793, there is a problem in that even if air conditioning control is performed on the basis of the estimated thermal sensation, the environmental temperature may not necessarily be comfortable to the relevant person.

The present disclosure focuses on the above problems, and provides an air conditioner, a sensor system, and a thermal sensation estimation method enabling more accurate estimation of a person's thermal sensation.

An air conditioner according to an aspect of the present disclosure is provided with a thermal image acquirer that acquires a thermal image indicating a temperature distribution inside an air-conditioned space, and a thermal sensation estimator that estimates a thermal sensation of a person in the air-conditioned space based on the thermal image obtained from the thermal image acquirer and a parameter set in the air conditioner, the parameter prescribing at least one of a wind direction, a wind speed, and a wind temperature of wind emitted from the air conditioner, and a controller that conducts air conditioning control of the air-conditioned space based on the thermal sensation of the person in the air-conditioned space.

According to this configuration, an air conditioner able to estimate a person's thermal sensation more accurately may be realized. Consequently, the air conditioner is able to conduct air conditioning control of the air-conditioned space on the basis of the accurately estimated thermal sensation of the person to make the environmental temperature more comfortable for that person.

As an example, the air conditioner additionally may be provided with a wind speed estimator that estimates a wind speed inside the air-conditioned space. The wind speed estimator may estimate the wind speed inside the air-conditioned space based on a blow parameter set in the air conditioner, the blow parameter prescribing the wind speed at an outlet port of the air conditioner that blows air into the air-conditioned space, and the thermal sensation estimator may estimate the thermal sensation of the person based on the thermal image and the wind speed estimated by the wind speed estimator.

As another example, the air conditioner additionally may be provided with a thermal emission estimator that estimates a human body thermal emission of the person based on the thermal image and the wind speed estimated by the wind speed estimator. The thermal sensation estimator may estimate the thermal sensation of the person based on the human body thermal emission of the person estimated by the thermal emission estimator.

As another example, the air conditioner additionally may be provided with a temperature calculator that calculates a surface temperature of the person by using the thermal image, and a convective heat transfer coefficient calculator that calculates a convective heat transfer coefficient based on the wind speed estimated by the wind speed estimator. The thermal emission estimator may estimate the human body thermal emission of the person by using the convective heat transfer coefficient calculated by the convective heat transfer coefficient calculator, an ambient temperature which is a temperature of regions other than the person in the air-conditioned space, and the surface temperature of the person calculated by the temperature calculator.

As an example, the air conditioner additionally may be provided with a human position estimator that estimates a position of the person relative to the air conditioner based on the thermal image acquired by the thermal image acquirer and a position of the thermal image acquirer inside the air-conditioned space. The wind speed estimator may estimate the wind speed around the person in the air-conditioned space based on the position of the person estimated by the human position estimator, and the blow parameter, and the convective heat transfer coefficient calculator may calculate the convective heat transfer coefficient of the person based on the wind speed around the person estimated by the wind speed estimator.

As another example, the air conditioner additionally may be provided with a human position estimator that estimates a position of the person relative to the air conditioner based on the thermal image and a position of the thermal image acquirer inside the air-conditioned space, and a wind temperature estimator that estimates a wind temperature around the person in the air-conditioned space based on the position of the person estimated by the human position estimator and a blow temperature at the outlet port of the air conditioner. The thermal emission estimator may estimate the human body thermal emission of the person by using the wind temperature around the person estimated by the wind temperature estimator as the ambient temperature.

As an example, the wind temperature estimator may estimate the wind temperature around the person based on the position of the person estimated by the human position estimator, and a blow temperature parameter set in the air conditioner, the blow temperature parameter prescribing a blow temperature at the outlet port of the air conditioner that blows air into the air-conditioned space to conduct air conditioning control.

As another example, the human position estimator may estimate the position of the person by using a position of the person's feet in the thermal image acquired by the thermal image acquirer, a height of the thermal image acquirer from a floor in the air-conditioned space, and an effective angular field of view of the thermal image acquirer.

As another example, if the wind speed at the outlet port is varied, the human region temperature calculator may use a thermal image obtained from the thermal image acquirer before the variation in the wind speed at the outlet port and a thermal image obtained from the thermal image acquirer after the variation in the wind speed at the outlet port to calculate a surface temperature of the person before the variation and a surface temperature of the person after the variation, and the wind speed estimator may estimate the wind speed around the person in the air-conditioned space based on the surface temperature of the person before the variation and the surface temperature of the person after the variation.

As another example, the wind speed at the outlet port may be varied by setting the blow parameter so as to prescribe the wind speed at the outlet port to zero, and after that, prescribe the wind speed at the outlet port to a certain speed.

As another example, the temperature calculator may calculate the surface temperature of the person and the ambient temperature by using the thermal image.

As another example, the air conditioner additionally may be provided with a received heat calculator that calculates a received heat, the received heat being an amount of heat that the person receives. The thermal emission estimator may estimate the human body thermal emission of the person by using the convective heat transfer coefficient calculated by the convective heat transfer coefficient calculator, an ambient temperature that is a temperature of regions other than the person in the air-conditioned space, the surface temperature of the person calculated by the temperature calculator, and the received heat calculated by the received heat calculator.

As an example, the received heat calculator may include a sunlight intensity estimator that estimates a sunlight intensity on the person, a sunlight area calculator that calculates a surface area of part of the person on which sunlight is incident, and a received heat computer that calculates the received heat by using the sunlight intensity estimated by the sunlight intensity estimator, the surface area calculated by the sunlight area calculator, and a clothing absorption ratio of the person.

As another example, the temperature calculator may calculate a temperature of the face or inside the face of the person as the surface temperature of the person.

As another example, the temperature calculator may calculate a temperature of a femoral region of the person as the surface temperature of the person.

As another example, the temperature calculator may calculate an average temperature of a region recognized as the person in the thermal image as the surface temperature of the person.

As another example, at least one of the thermal image acquirer, the thermal sensation estimator, and the controller may include a processor.

Also, a thermal sensation estimation method of an air conditioner according to an aspect of the present disclosure includes acquiring a thermal image indicating a temperature distribution inside an air-conditioned space, estimating a thermal sensation of a person in the air-conditioned space based on the acquired thermal image and a parameter set in the air conditioner, the parameter prescribing at least one of a wind direction, a wind speed, and a wind temperature of wind emitted from the air conditioner, and controlling air conditioning of the air-conditioned space based on the thermal sensation of the person in the air-conditioned space.

As another example, at least one of the acquiring of the thermal image, the estimating of the thermal sensation, and the controlling may be executed by a processor provided in the air conditioner.

Also, a sensor system installed on board an air conditioner according to an aspect of the present disclosure is a sensor system installed on board an air conditioner that conducts air conditioning control of an air-conditioned space based on a thermal sensation of a person in the air-conditioned space. The sensor system includes a thermal image acquirer that acquires a thermal image indicating a temperature distribution inside the air-conditioned space, and a thermal sensation estimator that estimates the thermal sensation of the person in the air-conditioned space based on the thermal image obtained from the thermal image acquirer and a parameter set in the air conditioner, the parameter prescribing at least one of a wind direction, a wind speed, and a wind temperature of wind emitted from the air conditioner. As another example, at least one of the thermal image acquirer and the thermal sensation estimator may include a processor.

Note that general or specific embodiments may also be realized by a system, method, integrated circuit, computer program, or recording medium such as a CD-ROM disc, or any selective combination thereof.

Hereinafter, technology such as an air conditioner according to an exemplary embodiment of the present disclosure will be described specifically with reference to the drawings. Note that the embodiments described hereinafter all illustrate specific examples of the present disclosure. Features such as numerical values, shapes, materials, structural elements, and layout positions of structural elements indicated in the following exemplary embodiments are merely examples, and are not intended to limit the present disclosure. In addition, among the structural elements in the following exemplary embodiments, structural elements that are not described in the independent claim indicating the broadest concept are described as arbitrary or optional structural elements.

Embodiment 1

Configuration of Air Conditioner

Hereinafter, an air conditioner according to Embodiment 1 will be described with reference to the drawings.

Figure 2:
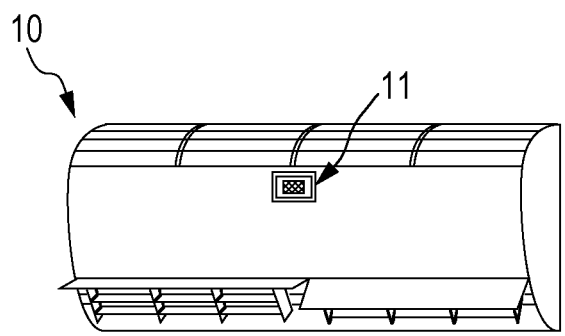
FIG. 2 is an overview of an example of an air conditioner according to Embodiment 1.
Figure 3:
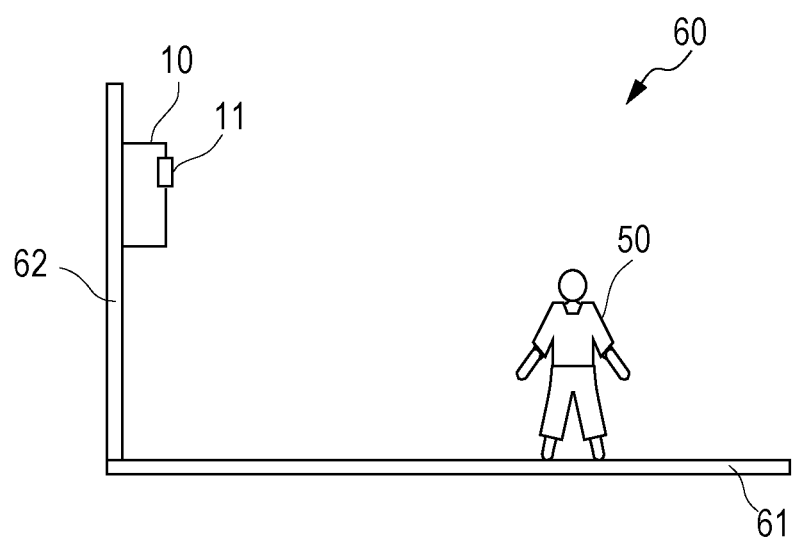
FIG. 3 is a diagram illustrating an example of how the air conditioner in FIG. 2 is installed.
Figure 4A:
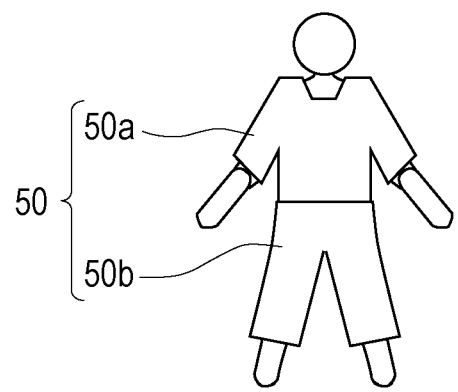
FIG. 4A is a diagram schematically representing a person in an air-conditioned space.
Figure 4B:
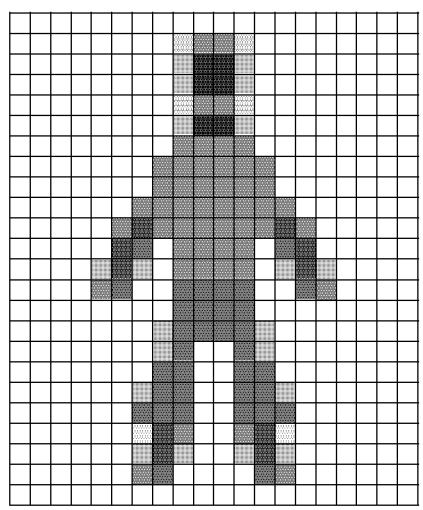
FIG. 4B is a diagram illustrating an example of a thermal image of the person illustrated in FIG. 4A.

FIG. 1 is a diagram illustrating an example of a configuration of an air conditioner according to Embodiment 1. FIG. 2 is an overview of an example of an air conditioner according to the present embodiment. FIG. 3 is a diagram illustrating an example of how the air conditioner in FIG. 2 is installed. FIG. 4A is a diagram schematically representing a person in an air-conditioned space. FIG. 4B is a diagram illustrating an example of a thermal image of the person illustrated in FIG. 4A.

The air conditioner 10 is an air conditioner that conducts air conditioning control of an air-conditioned space on the basis of a thermal sensation of a person in the air-conditioned space.

The air conditioner 10 is an air conditioner like the one illustrated in FIG. 2, for example, and is installed at a prescribed height from a floor 61 on a wall 62, which is a mounting surface approximately perpendicular to the floor 61 of the air-conditioned space 60, as illustrated in FIG. 3, for example. The air conditioner 10 estimates the thermal sensation of the person 50 in the air-conditioned space 60, on the basis of a thermal image acquired by a thermal image acquisition unit 11 affixed to the front face of the air conditioner 10, for example. Herein, a thermal image is an image made up of multiple pixels indicating a temperature distribution inside the air-conditioned space 60. Also, the prescribed height refers to a height that is higher than the target of temperature detection, such as a person, for example, and is a height of 1800 mm or more, for example. The air-conditioned space 60 is a room, for example, while the floor 61 is the floor of the room and the wall 62 is a wall of the room, for example.

In the present embodiment, the air conditioner 10 is at least equipped with a thermal image acquisition unit 11, a temperature sensor 12, a computational unit 13, and a control unit 14, as illustrated in FIG. 1. In addition, as illustrated in FIG. 1, the air conditioner 10 is equipped with parts such as a louver, a compressor, and a fan, and conducts air conditioning control of the air-conditioned space by controlling these parts on the basis of the thermal sensation of a person in the air-conditioned space 60.

The thermal image acquisition unit 11 is a thermographic instrument affixed to the front face of the air conditioner 10, for example, and acquires a thermal image indicating a temperature distribution inside the air-conditioned space 60.

The thermal image acquisition unit 11 has an effective angular field of view (angle of view) in the vertical direction and an effective angular field of view in the horizontal direction, and is able to acquire a two-dimensional thermal image of a body existing in the air-conditioned space 60 in front of the air conditioner 10. The thermal image acquisition unit 11 may also include infrared detection elements (pixels) arranged in a two-dimensional matrix, for example, and be configured to acquire a two-dimensional thermal image all at once. Also, the thermal image acquisition unit 11 may include a line sensor, or in other words, infrared detection elements (pixels) arranged one-dimensionally, for example, and be configured to acquire a two-dimensional thermal image by scanning one-dimensionally. In other words, the thermal image acquisition unit 11 may be configured in any way enabling the acquisition of a two-dimensional thermal image.

In the present embodiment, the thermal image acquisition unit 11 acquires a thermal image indicating a temperature distribution inside the air-conditioned space 60. In other words, if the person 50 is present in the air-conditioned space 60 in front of the air conditioner 10 as in FIG. 3, for example, the thermal image acquisition unit 11 acquires a thermal image indicating a temperature distribution of the air-conditioned space 60 including the person 50.

For example, as illustrated in FIG. 4A, suppose that the person 50 is wearing an upper garment 50a and pants 50b, for example, and that the ambient temperature (the temperature of the air-conditioned space 60) is room temperature at approximately 25 degrees C., for example. In this case, the thermal image acquisition unit 11 acquires a thermal image like the one illustrated in FIG. 4B, for example. In the thermal image illustrated in FIG. 4B, portions (pixels) of higher body temperature are displayed more densely. In other words, in the thermal image illustrated in FIG. 4B, pixels of higher temperature are displayed with a color closer to black. However, the display of a thermal image is not limited to the above.

On the person 50 illustrated in FIG. 4A, the surface temperature of the portions corresponding to the upper garment 50a and the pants 50b is closer to the ambient temperature than the surface temperature of other sites where the skin of the person 50 is exposed (face, neck, hands, feet). In other words, the surface temperature of the portions corresponding to the upper garment 50a and the pants 50b is lower than the surface temperature of the other sites (face, neck, hands, feet). For this reason, in the thermal image illustrated in FIG. 4B, the regions corresponding to the upper garment 50a and the pants 50b are displayed relatively less densely than the regions corresponding to the portions where the skin is exposed.

The temperature sensor 12 is a thermistor or thermocouple, for example, and is able to measure the temperature of a point in the air-conditioned space 60 or a point on the surface of a member. In the present embodiment, the temperature sensor 12 is placed in a location such as the air intake port inside the air conditioner 10, for example, and measures the ambient temperature, which is the temperature of regions other than the person 50 in the air-conditioned space 60. The temperature sensor 12 transmits the measured ambient temperature to the computational unit 13.

The control unit 14 controls parts such as the louver, the compressor, and the fan on the basis of a result from the computational unit 13, or in other words, an estimated thermal sensation of the person 50 in the air-conditioned space 60, and thereby conducts air conditioning control of the air-conditioned space 60 so that the environmental temperature becomes comfortable for the person 50. For example, if the control unit 14 determines, from the estimated thermal sensation of the person 50, that the person 50 feels hot, the control unit 14 causes the compressor and the fan to operate to control the wind temperature and wind speed, and thereby cause cool air to be produced. Note that the control unit 14 may additionally use the thermal image acquired by the thermal image acquisition unit 11 to recognize the position of the person 50, and cause the louver to face in the direction of the recognized person 50. Consequently, since the ambient temperature around the person 50 may be lowered, the person 50 no longer feels hot and is able to be comfortable. In addition, for example, if the control unit 14 determines, from the estimated thermal sensation of the person 50, that the person 50 feels cold, the control unit 14 causes the compressor and the fan to operate to control the wind temperature and wind speed, and thereby cause warm air to be produced. Note that the control unit 14 may additionally use the thermal image acquired by the thermal image acquisition unit 11 to recognize the position of the person 50, and cause the louver to face in the direction of the recognized person 50. Consequently, since the ambient temperature around the person 50 may be raised, the person 50 no longer feels cold and is able to be comfortable.

Figure 5:
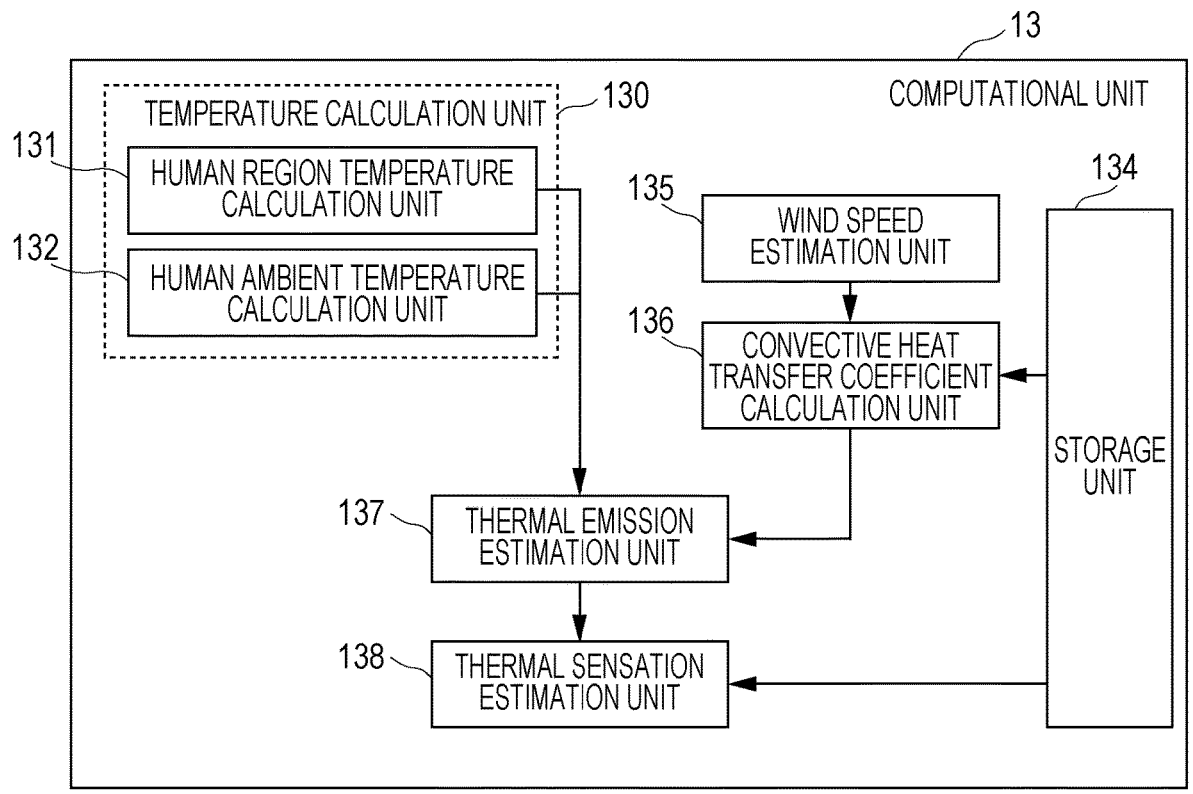
FIG. 5 is a diagram illustrating an example of a configuration of a computational unit of an air conditioner according to Embodiment 1.
Figure 6:
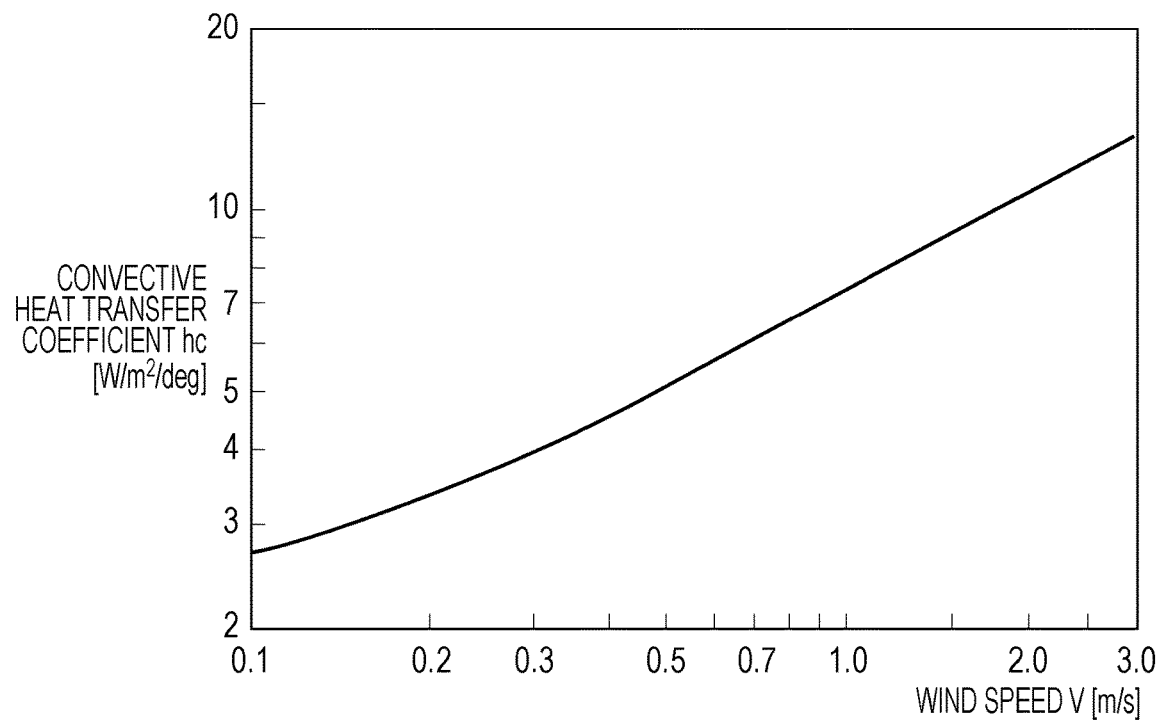
FIG. 6 is a diagram illustrating an example of information indicating a relationship between wind speed and convective heat transfer coefficient stored by a storage unit according to Embodiment 1.

FIG. 5 is a diagram illustrating an example of a configuration of a computational unit of an air conditioner according to Embodiment 1. FIG. 6 is a diagram illustrating an example of information indicating a relationship between wind speed and convective heat transfer coefficient stored by a storage unit according to Embodiment 1.

The computational unit 13 estimates the thermal sensation of the person 50 in the air-conditioned space 60, on the basis of a thermal image acquired by the thermal image acquisition unit 11. In the present embodiment, as illustrated in FIG. 5, the computational unit 13 is equipped with a temperature calculation unit 130, a storage unit 134, a wind speed estimation unit 135, a convective heat transfer coefficient calculation unit 136, a thermal emission estimation unit 137, and a thermal sensation estimation unit 138.

The temperature calculation unit 130 is equipped with a human region temperature calculation unit 131 and a human ambient temperature calculation unit 132. Note that the temperature calculation unit 130 may also not be equipped with the human ambient temperature calculation unit 132.

The human ambient temperature calculation unit 132 uses a thermal image indicating a temperature distribution inside the air-conditioned space 60 to calculate the ambient temperature, which is the temperature of the regions other than the person 50 in the air-conditioned space 60. More specifically, the human ambient temperature calculation unit 132 uses a thermal image acquired by the thermal image acquisition unit 11, such as the thermal image indicating a temperature distribution inside the air-conditioned space 60 illustrated in FIG. 4B, for example, to calculate the ambient temperature. At this point, if the ambient temperature and the wall surface temperature are treated as being the same, the ambient temperature may also be estimated based on the estimated wall surface temperature.

The human region temperature calculation unit 131 uses a thermal image indicating a temperature distribution inside the air-conditioned space 60 to calculate the surface temperature of the person 50. More specifically, the human region temperature calculation unit 131 uses a thermal image acquired by the thermal image acquisition unit 11, such as the thermal image indicating a temperature distribution inside the air-conditioned space 60 illustrated in FIG. 4B, for example, to calculate the surface temperature of the person 50. At this point, the human region temperature calculation unit 131 may treat the surface temperature of the person 50 as being the temperature of the face or inside the face of the person 50, and calculate an average temperature of the region (face region) recognized as the face of the person 50 in the thermal image or calculate the temperature of a region (forehead region) recognized as the forehead of the person 50. In addition, the human region temperature calculation unit 131 may also calculate an average temperature of a region (human region) recognized as the person 50 in the thermal image as the surface temperature of the person 50. Note that the human region temperature calculation unit 131 may also calculate a temperature of a region recognized as the femoral region of the person 50 in the thermal image as the surface temperature of the person 50. This is because the temperature of a person's femoral region is considered to be close to the person's average skin temperature.

The wind speed estimation unit 135 estimates the wind speed inside the air-conditioned space 60. In the present embodiment, the wind speed estimation unit 135 estimates the wind speed inside the air-conditioned space 60 on the basis of a blow parameter set in the air conditioner 10. The blow parameter prescribes the wind speed at the outlet port of the air conditioner 10 that blows air into the air-conditioned space 60 to conduct air conditioning control. In other words, in the present embodiment, the wind speed estimation unit 135 estimates the wind speed at the outlet port of the air conditioner 10 set by the blow parameter as the wind speed inside the air-conditioned space 60.

The storage unit 134 preliminarily stores information indicating a relationship between the wind speed and the convective heat transfer coefficient, like the table illustrated in FIG. 6, for example. As illustrated in FIG. 6, the convective heat transfer coefficient has a tendency of forming a linear relationship with the wind speed in a region of comparatively fast wind speed. On the other hand, in a region of comparatively slow wind speed, the convective heat transfer coefficient is considered to have a tendency of increasing as the wind speed increases, but not in a linear relationship with the wind speed. However, ordinarily this relationship is derived from measurement, and there is a possibility of obtaining a result different from this graph. Thus, the relationship between the wind speed and the convective heat transfer coefficient is not limited to the shape of this graph.

The convective heat transfer coefficient calculation unit 136 calculates the convective heat transfer coefficient of the person 50 on the basis of the wind speed estimated by the wind speed estimation unit 135. In the present embodiment, the convective heat transfer coefficient calculation unit 136 references information indicating a relationship between the wind speed and the convective heat transfer coefficient stored in the storage unit 134, and calculates the convective heat transfer coefficient of the person 50 from the wind speed estimated by the wind speed estimation unit 135.

The thermal emission estimation unit 137 estimates the human body thermal emission of the person 50, on the basis of a thermal image obtained from the thermal image acquisition unit 11 and the wind speed estimated by the wind speed estimation unit 135. More specifically, the thermal emission estimation unit 137 estimates the human body thermal emission of the person 50 by using the convective heat transfer coefficient calculated by the convective heat transfer coefficient calculation unit 136, the ambient temperature which is the temperature of the regions other than the person 50 in the air-conditioned space 60, and the surface temperature of the person 50 calculated by the temperature calculation unit 130. Note that the thermal emission estimation unit 137 may use an ambient temperature calculated by the temperature calculation unit 130, or an ambient temperature measured by the temperature sensor 12.

Figure 7:
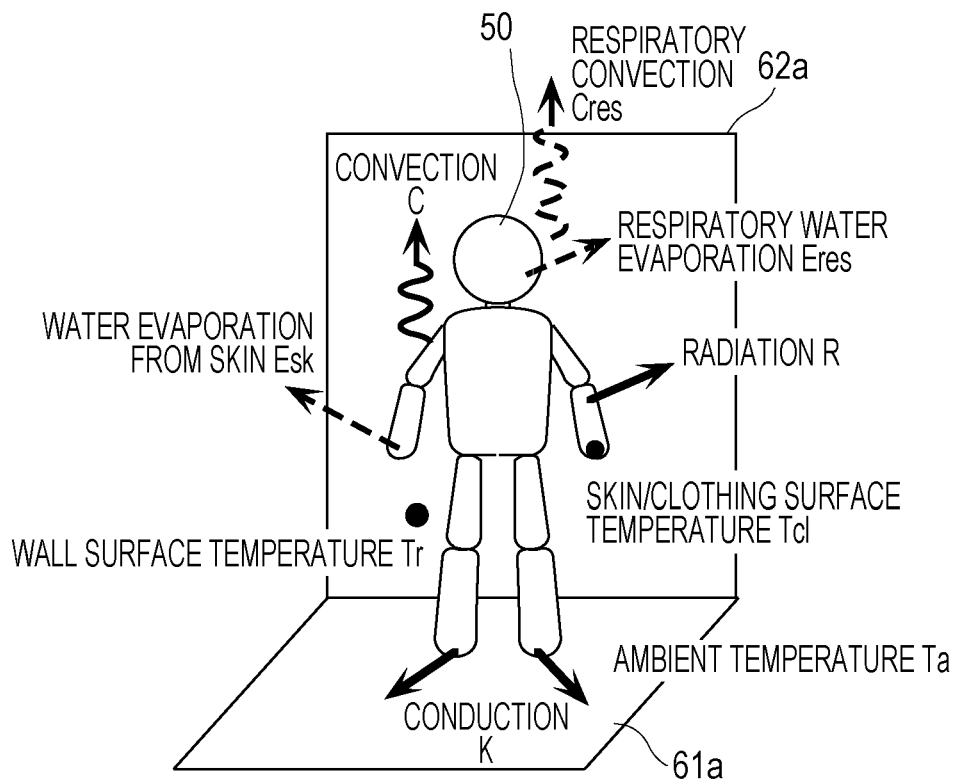
FIG. 7 is a diagram for explaining a method of estimating human body thermal emission.

At this point, FIG. 7 will be used to explain a method of estimating human body thermal emission. FIG. 7 is a diagram for explaining a method of estimating human body thermal emission.

Human body thermal emission, or in other words thermal emission from the human body, may be expressed by the following Formulas 1 to 3.

$$H[W/m^2]=R+C+K+Esk+Eres+Cres \qquad \text{(Formula 1)}$$

$$R=hr \times (Tcl-Tr) \qquad \text{(Formula 2)}$$

$$C=hc \times (Tcl-Ta) \qquad \text{(Formula 3)}$$

Herein, H represents the human body thermal emission, R the radiation from the human body, C the convection (heat transfer from the human body to the air), K the conduction (heat transfer from a contact region of the human body in contact with an object such as the floor), Esk the water evaporation from the skin of the human body, Eres the respiratory water evaporation of the human body, and Cres the respiratory convection. Also, hr represents the radiative heat transfer coefficient, hc the convective heat transfer coefficient, Tcl the surface temperature of the human body, Tr the wall surface temperature, and Ta the ambient temperature.

In the space in which the person 50 illustrated in FIG. 7 is present (air-conditioned space), assuming that the air is still, the temperature of the air-conditioned space (room temperature) and the temperature of the wall 62a (wall surface temperature) are the same, and also that non-evaporative heat loss is dominant and the conduction K is small (the contact surface area between the floor 61a and the feet of the person 50 is small), the human body thermal emission H may be expressed like in the following Formula 4.

$$H[W/m^2]=R+C=(hr+hc) \times (Tcl-Tr) \qquad \text{(Formula 4)}$$

Herein, hr is 4.65 [$W/m^2/deg$], and hc is 3.7 [$W/m^2/deg$], for example.

In other words, in this case, if the difference between the average value of a person's surface temperature (average skin temperature) and the ambient temperature (or wall surface temperature) is known, that difference can be multiplied by the sum of hr and hr (4.65+3.7=8.35) to estimate the human body thermal emission.

However, in the air-conditioned space 60 where the air conditioner 10 is installed, wind is often present, such as the blow of the air conditioner 10. Additionally, if there is wind in the air-conditioned space 60, the convective heat transfer coefficient hc discussed above changes. For example, if the wind becomes stronger, the convective heat transfer coefficient hc becomes larger, and thus a person may feel cold even at the same room temperature because the thermal emission increases. In other words, in the case of estimating the human body thermal emission by using a prescribed value for the convective heat transfer coefficient hc that assumes a state of still air, the numerical value of the human body thermal emission does not change even if there is wind, and thus that person's thermal sensation is mistakenly estimated as not changing. Alternatively, if the wind causes the person's surface temperature to drop, the thermal emission conversely may be underestimated in some cases. For this reason, a problem occurs in that, for a person who is actually feeling cold because of the effects of wind, that person's thermal sensation is mistakenly estimated as not changing, or the person is even estimated to feel hot instead.

Accordingly, in the present embodiment, to more accurately estimate a person's thermal sensation, the thermal emission estimation unit 137 more accurately estimates the human body thermal emission while also accounting for the effects of wind. In other words, the thermal emission estimation unit 137 estimates the human body thermal emission of the person 50 by using the convective heat transfer coefficient calculated by the convective heat transfer coefficient calculation unit 136, the ambient temperature which is the temperature of the regions other than the person 50 in the air-conditioned space 60, and the surface temperature of the person 50 calculated by the temperature calculation unit 130. Note that in the present embodiment, the thermal emission estimation unit 137 may also estimate the human body thermal emission of the person 50 by treating the temperature of wind reaching the person 50 (wind temperature) and the ambient temperature of the air-conditioned space 60 (room temperature) as the same.

The thermal sensation estimation unit 138 estimates the thermal sensation of the person 50 on the basis of a thermal image obtained from the thermal image acquisition unit 11 and parameters set in the air conditioner 10. The parameters herein prescribe at least one of the wind direction, the wind speed, and the wind temperature of wind emitted from the air conditioner 10. More specifically, the thermal sensation estimation unit 138 estimates the thermal sensation of the person 50 on the basis of a thermal image obtained from the thermal image acquisition unit 11 and a wind speed estimated by the wind speed estimation unit 135.

In the present embodiment, the thermal sensation estimation unit 138 estimates the thermal sensation of the person 50 on the basis of the human body thermal emission of the person 50 estimated by the thermal emission estimation unit 137. The thermal sensation estimation unit 138 holds information indicating a relationship between the human body thermal emission and the thermal sensation, such as a relationship of a person feeling cold to the extent that the human body thermal emission is large, for example. In addition, the thermal sensation estimation unit 138 preliminarily holds threshold values at which a person feels neither hot nor cold in the information indicating a relationship between the human body thermal emission and the thermal sensation. Consequently, the thermal sensation estimation unit 138 is able to estimate the thermal sensation of the person 50 by using the human body thermal emission of the person 50 estimated by the thermal emission estimation unit 137 and the information indicating a relationship between the human body thermal emission and the thermal sensation. For example, if the thermal emission is greater than a threshold value, the person will feel chilly or cold depending on the degree of thermal emission, and feel colder with increasing thermal emission. Conversely, if the thermal emission is less than a threshold value, the person will feel warm or hot depending on the degree of thermal emission, and feel hotter with decreasing thermal emission.

Note that the thermal sensation may also be indicated in stages, according to the amount of shift from a threshold value.

In addition, the threshold value may also be modified depending on the person. The threshold value may be estimated from the dietary intake (caloric intake) and the surface area of the person. Since the surface area of a person may be estimated from the height and weight of the person, by having a user input his or her caloric intake, height, and weight into the thermal sensation estimation unit 138, this threshold value may be calculated and set individually inside the thermal sensation estimation unit 138 to determine the thermal sensation. This configuration enables highly accurate estimation of thermal sensation that additionally accounts for individual differences. Dietary intake (caloric intake) may also differ depending on race or ethnicity, but by inputting caloric intake, height, and weight as above, estimation of the thermal sensation that additionally accounts for racial or ethnic differences becomes possible. Additionally, human metabolic rates are known to differ depending on age. Since children tend to have higher metabolic rates which then decrease with age, children have a greater thermal emission per unit surface area, and the thermal emission decreases with age. Accordingly, a table of threshold values according to age may be stored inside the thermal sensation estimation unit 138, and by having a user input his or her age, the threshold value may be changed according to the age to determine the thermal sensation. This configuration enables highly accurate estimation of thermal sensation that additionally accounts for age differences.

Furthermore, the above is applicable not only to humans, but also to animals. In other words, since a threshold value for thermal emission may be computed from caloric intake and the surface area of an animal as discussed above, in the case of a chicken, for example, the daily caloric intake of a chicken may be computed in advance, and the threshold value may be computed by calculation from the caloric intake and the body surface area of a chicken. By determining the threshold value for the thermal emission of a chicken calculated by the thermal emission estimation unit 137 similarly to the case of a human, it is possible to compute the thermal sensation for not only humans, but also animals.

[Operation of Air Conditioner]

Next, operation of the air conditioner 10 configured as above will be summarized.

Figure 8:
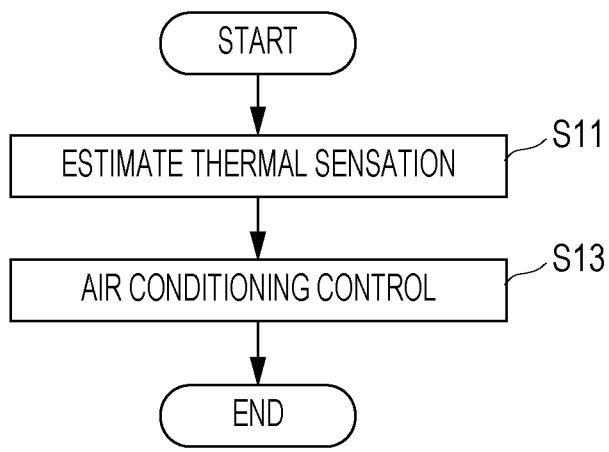
FIG. 8 is a flowchart illustrating a summary of operation of an air conditioner according to Embodiment 1.
Figure 9:
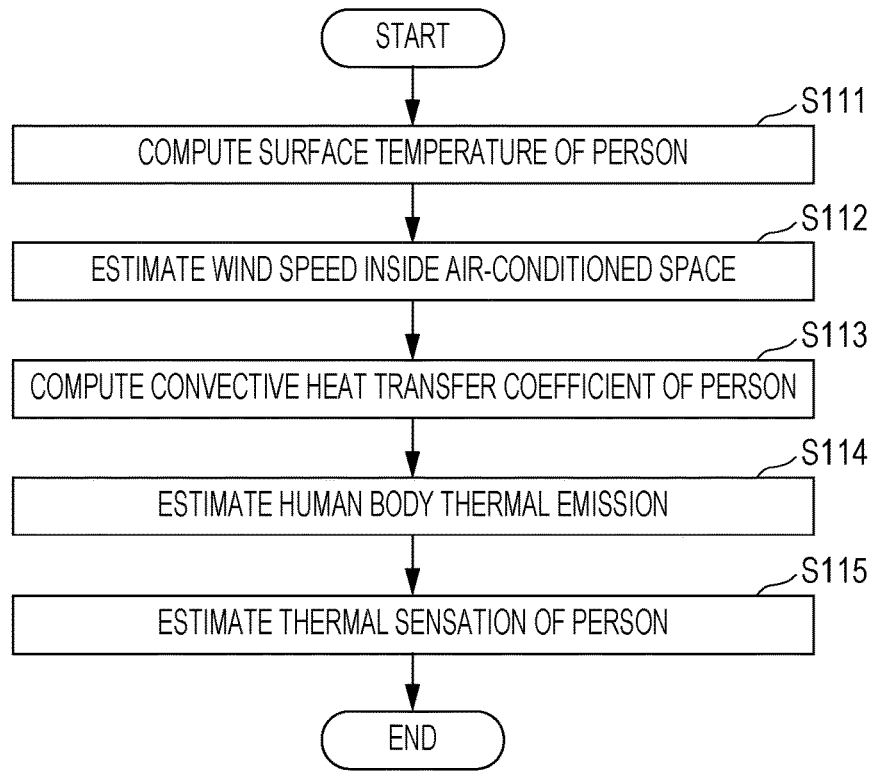
FIG. 9 is a flowchart illustrating a summary of a thermal sensation estimation process of an air conditioner according to Embodiment 1.

FIG. 8 is a flowchart illustrating a summary of operation of an air conditioner according to Embodiment 1. FIG. 9 is a flowchart illustrating a summary of a thermal sensation estimation process of an air conditioner according to Embodiment 1.

First, the air conditioner 10 estimates the thermal sensation (S11). Specifically, as illustrated in FIG. 9, the computational unit 13 provided in the air conditioner 10 uses a thermal image indicating a temperature distribution inside the air-conditioned space 60 to calculate the surface temperature of the person 50 in the air-conditioned space 60 (S111). Next, the computational unit 13 estimates the wind speed inside the air-conditioned space 60 (S112). Next, the computational unit 13 calculates the convective heat transfer coefficient of the person 50 on the basis of the wind speed estimated in S112 (S113). Next, the computational unit 13 estimates the human body thermal emission of the person 50 using the convective heat transfer coefficient calculated in S113, the ambient temperature which is the temperature of the regions other than the person 50 in the air-conditioned space 60, and the surface temperature of the person 50 calculated in S111 (S114). Next, the computational unit 13 estimates the thermal sensation of the person 50 on the basis of the human body thermal emission of the person 50 estimated in S114 (S115). A detailed description has been given above, and thus is omitted here. Note that the processing in S112 may be performed before or after the processing in S111, insofar as the processing in S112 is performed before the processing in S113.

Next, the air conditioner 10 conducts air conditioning control (S13). Specifically, the control unit 14 of the air conditioner 10 controls parts such as the louver, the compressor, and the fan on the basis of the estimated thermal sensation of the relevant person, and thereby conducts air conditioning control of the air-conditioned space so that the environmental temperature becomes comfortable for the relevant person. Note that a detailed description has been given above, and thus is omitted here.

Advantageous Effects of Embodiment 1

As above, the air conditioner 10 of Embodiment 1 estimates the wind speed of an air-conditioned space from a blow parameter set in the air conditioner 10, and uses information about a pre-calculated relationship between the wind speed and the convective heat transfer coefficient to thereby make a more accurate estimation of the human body thermal emission that accounts for the effects of wind. Consequently, since the air conditioner 10 is able to estimate a person's thermal sensation more accurately, the air conditioner 10 is able to conduct air conditioning control of the air-conditioned space on the basis of the accurately estimated thermal sensation of the person to make the environmental temperature more comfortable for that person.

Note that although Embodiment 1 estimates the human body thermal emission of the person 50 and estimates the thermal sensation of the person 50 while accounting for the effects of wind by presupposing that wind blown by the air conditioner 10 continually blows onto the person 50, the configuration is not limited thereto.

For example, the direction of the louver may be detected to estimate the direction of wind emitted from the air conditioner 10, and in addition, from a position of a person obtained from a thermal image, it may be determined whether or not the wind emitted from the air conditioner 10 is blowing onto the person. A convective heat transfer coefficient then may be selected on the basis of the determination result to estimate the thermal sensation.

For example, if wind blown by the air conditioner 10 blows onto the person 50 at some times and does not blow onto the person 50 at other times, the direction of the louver may be detected to estimate the direction of wind emitted from the air conditioner 10, and at timings when the wind is not blowing onto the person 50, the human body thermal emission of the person 50 may be estimated using a convective heat transfer coefficient for a state of still air, and the thermal sensation of the person 50 may be estimated.

As another example, the amount of time during which wind is blowing onto the person 50 may be calculated on the basis of the wind direction of wind by the air conditioner 10 and the louver scanning timings by the air conditioner 10. Subsequently, a convective heat transfer coefficient for the times when the wind is blowing onto the person 50 and a convective heat transfer coefficient for the times when the wind is not blowing onto the person 50 may be weighted to estimate the human body thermal emission of the person 50, and the thermal sensation of the person 50 may be estimated. A thermal emission while the wind is blowing onto the person 50 and a thermal emission while the wind is not blowing into the person 50 may also be computed separately, and the respective thermal emissions for these times may be weighted and averaged to thereby estimate the human body thermal emission of the person 50.

Note that the times during which the wind is blowing into the person 50 is not limited to the louver scanning timings, and may also be estimated from temperature variations in the region of the person 50 in a thermal image acquired by the thermal image acquisition unit 11. In addition, the air conditioner 10 may also use a thermal image acquired by the thermal image acquisition unit 11 to estimate the amount of clothing worn by the person 50 from a constant of surface temperature variation after the wind blows onto the person 50. For example, if the temperature rises more rapidly after the wind blows onto the person 50 during the summer, it may be estimated that the person 50 is wearing little clothing, whereas if the temperature falls more quickly after the wind blows onto the person 50 during the winter, it may be estimated that the person 50 is wearing much clothing. Subsequently, a person's thermal sensation may be estimated on the basis of the computed amount of clothing, or a person's thermal sensation may be estimated from a value such as a predicted mean vote (PMV) based on the amount of clothing computed in this way.

Modification 1

Embodiment 1 is described in terms of an example in which the wind speed of the air-conditioned space 60 is estimated from a blow parameter set in the air conditioner 10, but Embodiment 1 is not limited thereto. In this modification, a case will be described in which the wind speed around the person 50 in the air-conditioned space 60 is estimated from a position of the person 50 estimated from a thermal image, and a blow parameter set in the air conditioner 10.

[Configuration of Computational Unit]

Figure 10:
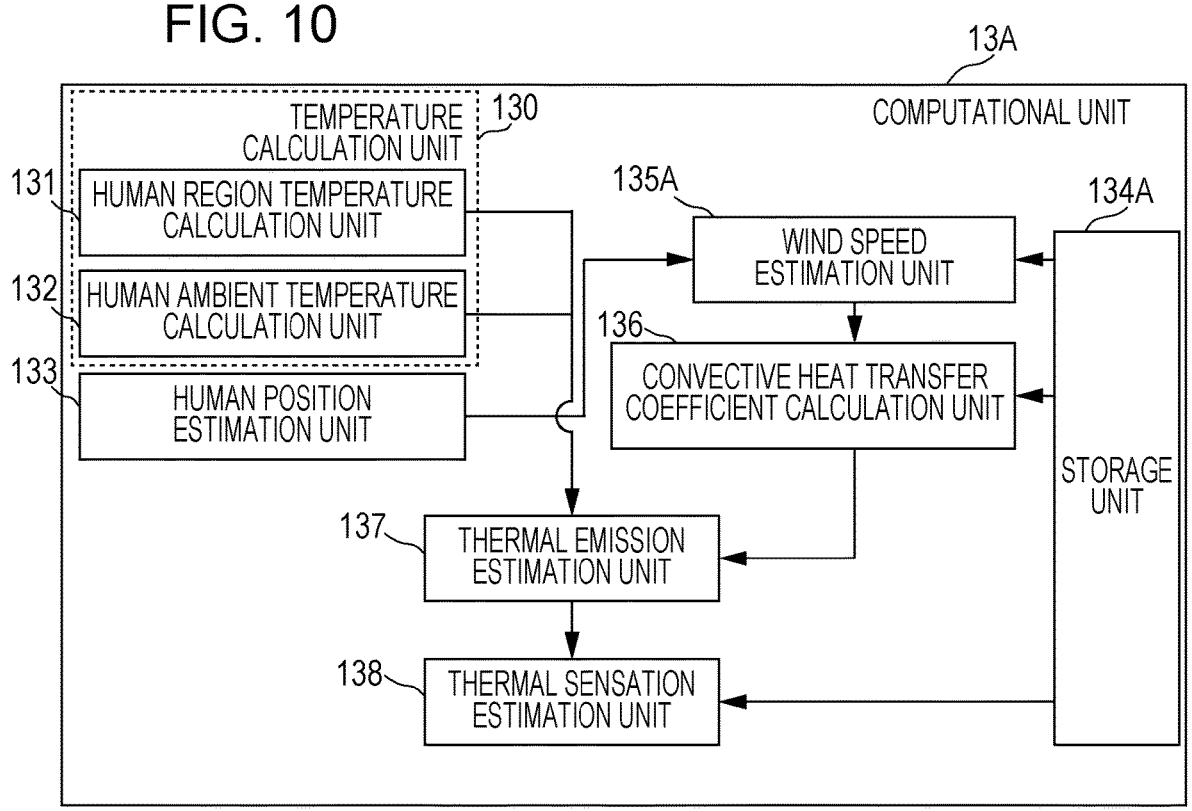
FIG. 10 is a diagram illustrating an example of a configuration of a computational unit according to Modification 1 of Embodiment 1.
Figure 11:
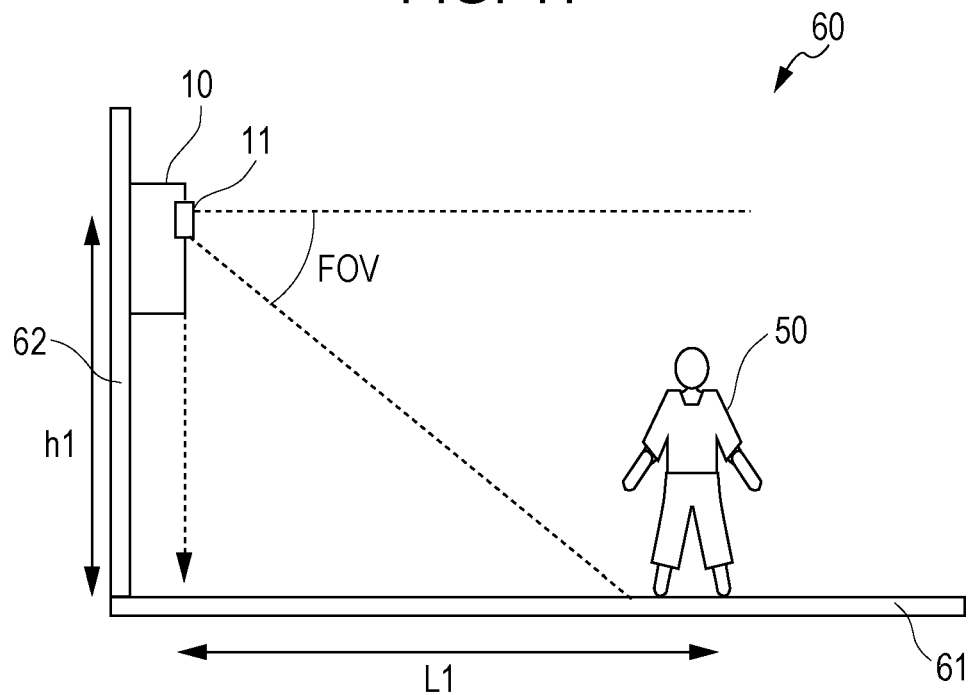
FIG. 11 is a diagram for explaining a method by which a human position estimation unit estimates the position of a person according to Modification 1 of Embodiment 1.
Figure 12:
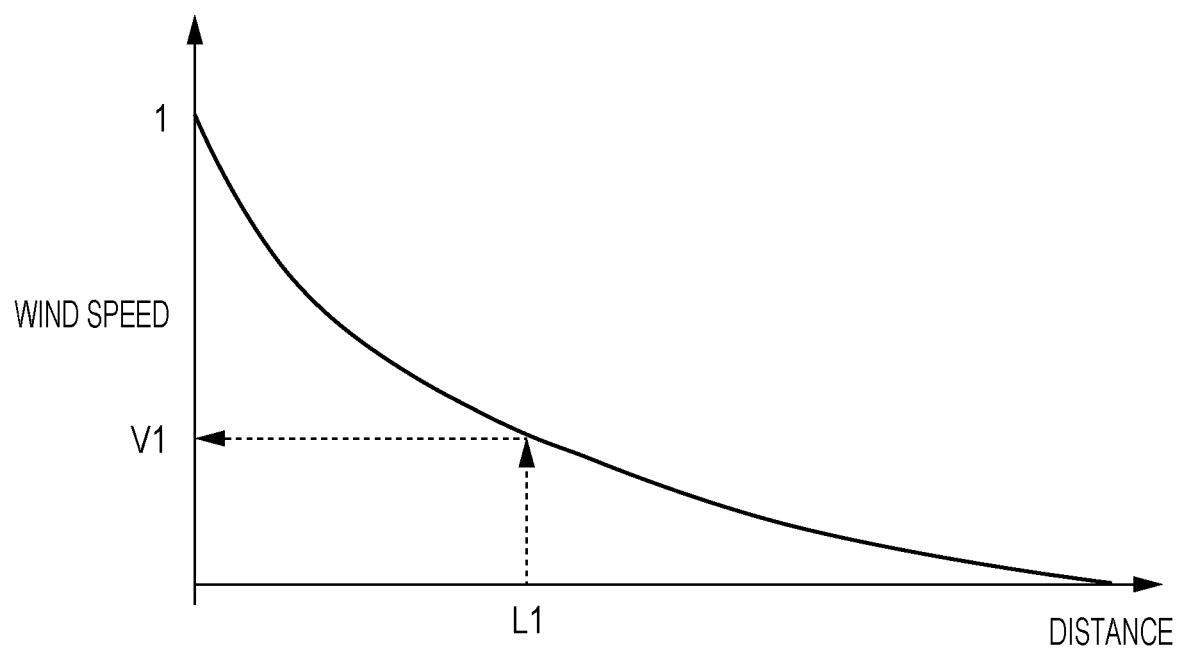
FIG. 12 is a diagram illustrating an example of information indicating a relationship between distance and wind speed stored by a storage unit according to Modification 1 of Embodiment 1.

FIG. 10 is a diagram illustrating an example of a configuration of a computational unit according to Modification 1 of Embodiment 1. FIG. 11 is a diagram for explaining a method by which a human position estimation unit estimates the position of a person according to Modification 1 of Embodiment 1. FIG. 12 is a diagram illustrating an example of information indicating a relationship between distance and wind speed stored by a storage unit according to Modification 1 of Embodiment 1. Note that elements similar to those in FIGS. 3 and 5 are denoted with like signs, and detailed description of such elements will be reduced or omitted.

Compared to the computational unit 13 illustrated in FIG. 5, the computational unit 13A illustrated in FIG. 10 differs in that a human position estimation unit 133 has been added, and the wind speed estimation unit 135A and the storage unit 134A are configured differently.

The human position estimation unit 133 estimates the position of the person 50 relative to the air conditioner 10, on the basis of a thermal image acquired by the thermal image acquisition unit 11 and the position of the thermal image acquisition unit 11 inside the air-conditioned space 60.

For example, the human position estimation unit 133 is able to estimate the position of the person 50 by using the position of the person's feet in a thermal image acquired by the thermal image acquisition unit 11, the height of the thermal image acquisition unit 11 from the floor 61 in the air-conditioned space 60, and the effective angular field of view (angle of view) of the thermal image acquisition unit 11.

Herein, the air conditioner 10 according to the present modification is installed on the wall 62 at a prescribed height from the floor 61, as illustrated in FIG. 11, for example. For this reason, the height (h1) from the floor 61 of the thermal image acquisition unit 11 affixed to the front face of the air conditioner 10 may be calculated from the height at which the air conditioner 10 is installed. Note that when the air conditioner 10 is installed, the height (h1) of the thermal image acquisition unit 11 may be input in advance into memory of the human position estimation unit 133 or the like. Also, the effective angular field of view (angle of view) in the vertical direction of the thermal image acquisition unit 11, or in other words, the field of view (FOV), is a design value and known in advance. For this reason, the FOV may also be input in advance into memory of the human position estimation unit 133 or the like. Consequently, by identifying the position of a person's feet or the position of a person's head in a thermal image acquired by the thermal image acquisition unit 11, the human position estimation unit 133 is able to estimate the position of the person 50 relative to the air conditioner 10 (distance L1) from the height (h1) of the thermal image acquisition unit 11 from the floor 61 and the FOV of the thermal image acquisition unit 11.

The storage unit 134A stores information indicating a relationship between the wind speed and the convective heat transfer coefficient as discussed earlier, as well as information indicating a relationship between distance and wind speed as illustrated in FIG. 12, for example. As illustrated in FIG. 12, the wind speed of wind sent out at a certain point at a constant speed (in FIG. 12, the initial speed 1) tends to decrease in speed as the distance increases.

The wind speed estimation unit 135A estimates the wind speed around the person 50 in the air-conditioned space 60, on the basis of the position of the person 50 estimated by the human position estimation unit 133, and a blow parameter set in the air conditioner 10. In the present modification, the wind speed estimation unit 135A is able to reference the information indicating a relationship between wind speed and distance stored in the storage unit 134A, treat the wind speed at the outlet port of the air conditioner 10 indicated by the blow parameter set in the air conditioner 10 as the wind speed of the initial speed, and estimate the wind speed around the person 50 in the air-conditioned space 60 (in FIG. 12, the wind speed V1) from the position of the person 50 estimated by the human position estimation unit 133 (distance L1).

Note that the convective heat transfer coefficient calculation unit 136 calculates the convective heat transfer coefficient of the person 50 on the basis of the wind speed around the person 50 estimated by the wind speed estimation unit 135A. The method by which the convective heat transfer coefficient calculation unit 136 calculates the convective heat transfer coefficient is the same as discussed earlier, and thus further description is omitted here.

Advantageous Effects of Modification 1

As above, by using information about a pre-calculated relationship between the wind speed and the distance, the air conditioner 10 of the present modification is able to estimate the wind speed around a person in an air-conditioned space from the position of the person 50 estimated from a thermal image and a blow parameter set in the air conditioner. Consequently, the air conditioner of the present modification is able to make a more accurate estimation of the human body thermal emission that accounts for the effects of wind around the person, and is able to more accurately estimate the person's thermal sensation.

Consequently, the air conditioner of the present modification is able to conduct air conditioning control of the air-conditioned space on the basis of the accurately estimated thermal sensation of the person to make the environmental temperature more comfortable for that person.

Note that although the human position estimation unit 133 estimates the position of the person 50 on the basis of a thermal image acquired by the thermal image acquisition unit 11 in the present modification, the configuration is not limited thereto. For example, the air conditioner 10 of the present modification additionally may include a visible light camera, and obtain the position of the person 50 from the visible light camera. Also, the air conditioner 10 of the present modification additionally may include a device such as a stereo camera or millimeter wave radar, and obtain the position of the person 50 by direct measurement using the stereo camera.

Modification 2

Embodiment 1 describes an air conditioner 10 that estimates a human body thermal emission accounting for the effects of wind by treating the temperature of the wind around the person 50 (wind temperature) as being the same as the temperature of the air-conditioned space 60 (room temperature). The present modification describes a method of estimating the human body thermal emission that accounts for the effects of wind when the wind temperature of wind blown from the air conditioner is different from the room temperature.

[Configuration of Computational Unit]

Figure 13:
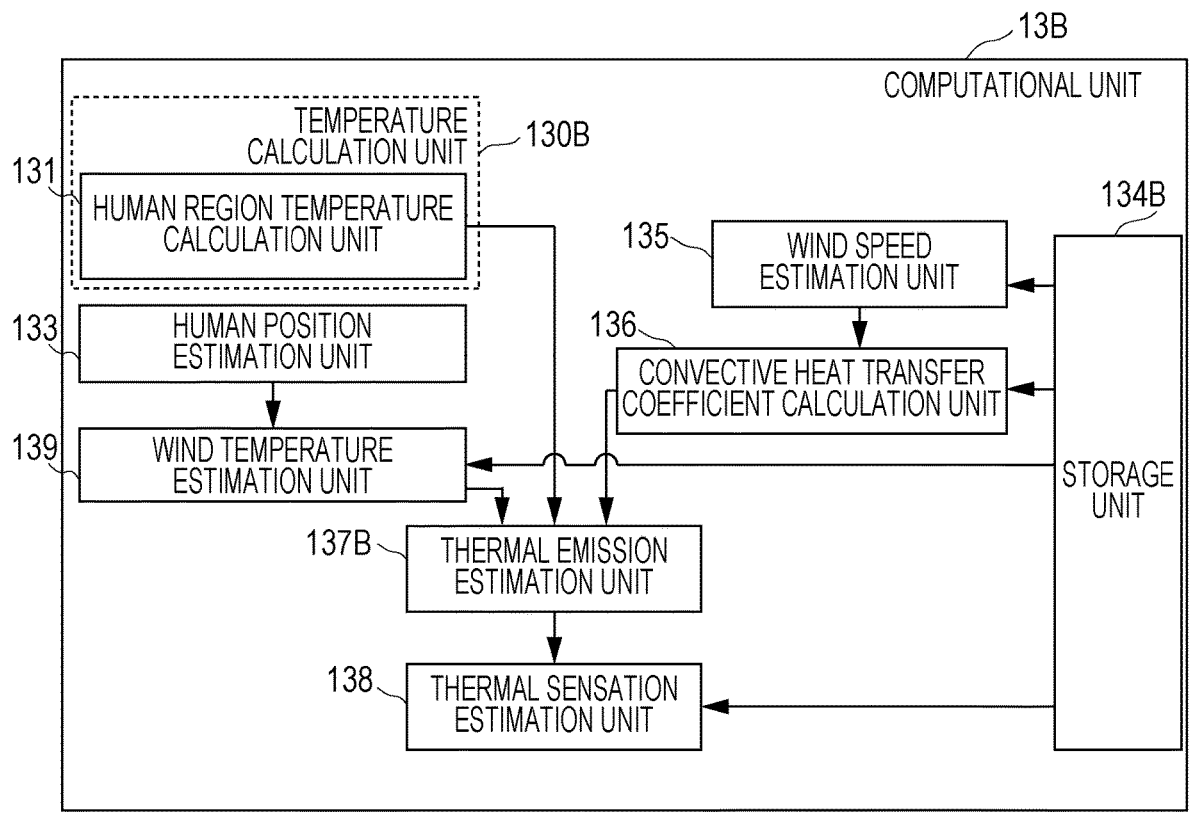
FIG. 13 is a diagram illustrating an example of a configuration of a computational unit according to Modification 2 of Embodiment 1.
Figure 14:
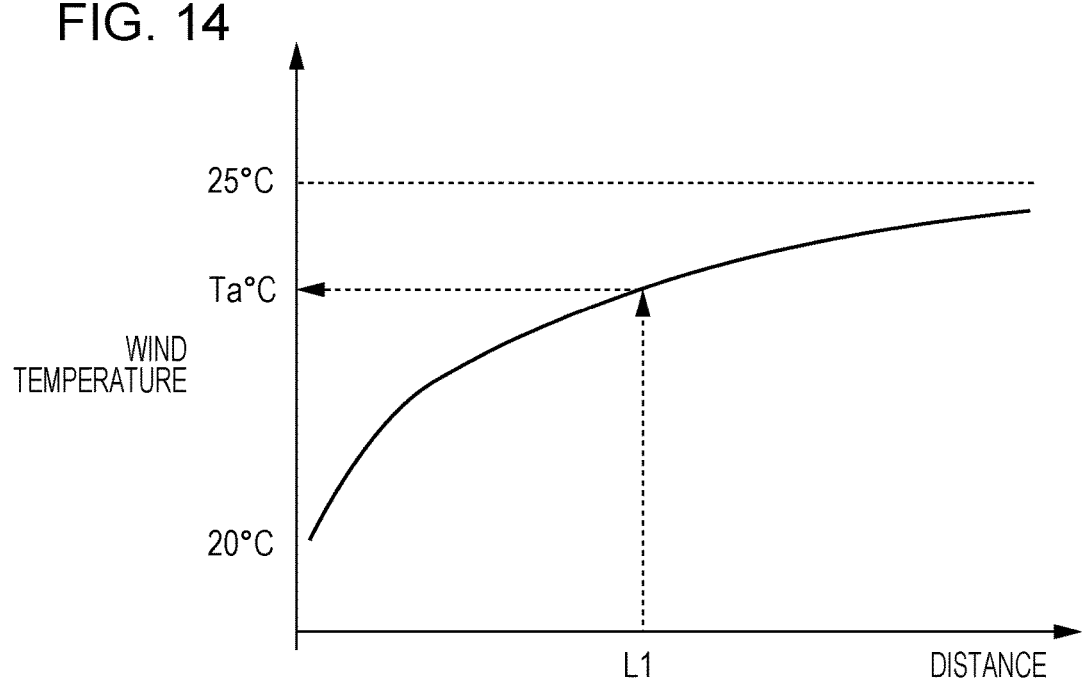
FIG. 14 is a diagram illustrating an example of information indicating a relationship between distance and wind temperature stored by a storage unit according to Modification 2 of Embodiment 1.
Figure 15:
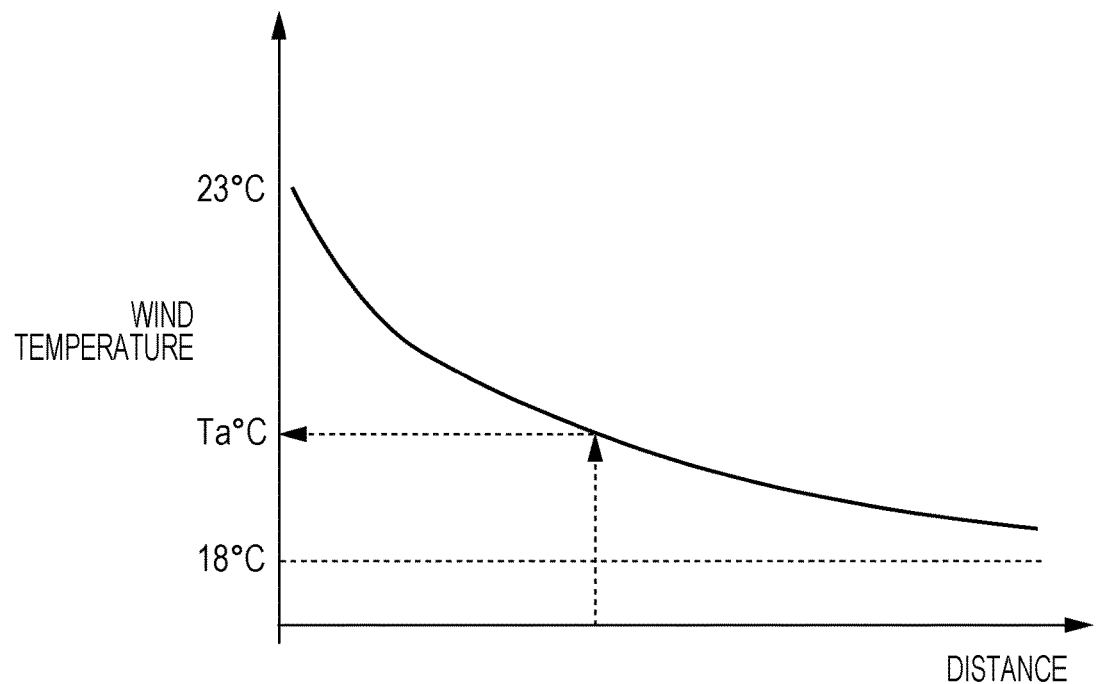
FIG. 15 is a diagram illustrating an example of information indicating a relationship between distance and wind temperature stored by a storage unit according to Modification 2 of Embodiment 1.
Figure 16:
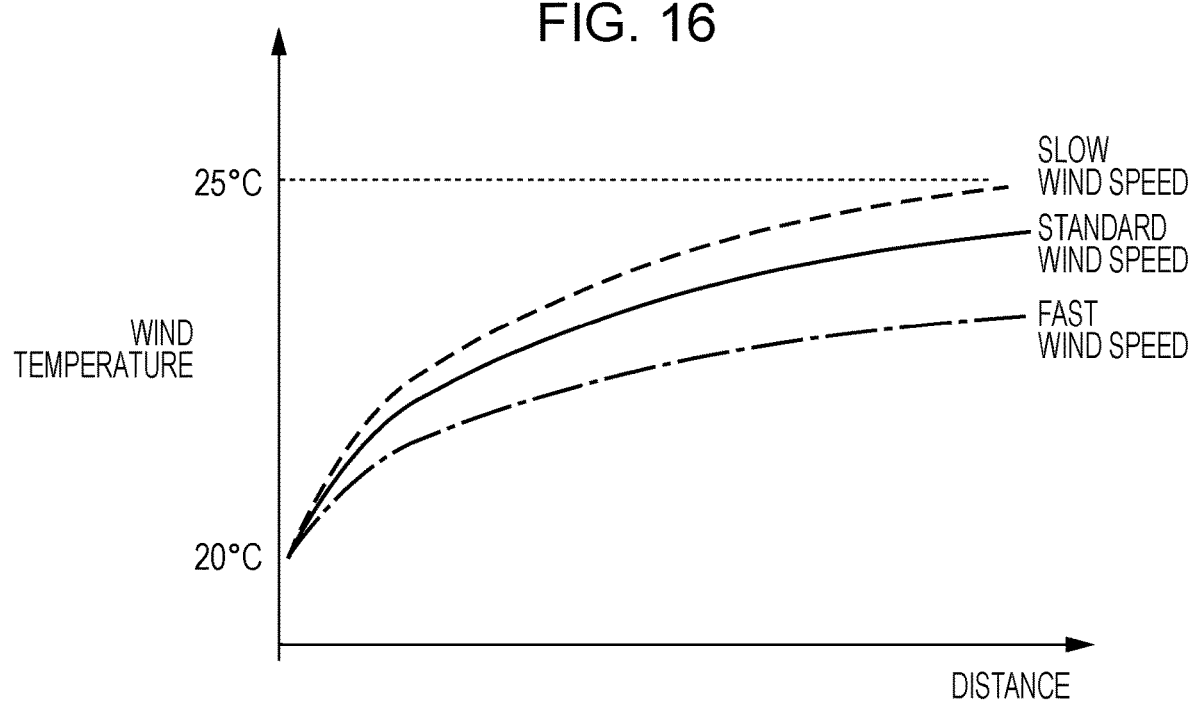
FIG. 16 is a diagram illustrating another example of information indicating a relationship between distance and wind temperature stored by a storage unit according to Modification 2 of Embodiment 1.

FIG. 13 is a diagram illustrating an example of a configuration of a computational unit according to Modification 2 of Embodiment 1. FIGS. 14 and 15 are diagrams illustrating examples of information indicating a relationship between distance and wind temperature stored by a storage unit according to Modification 2 of Embodiment 1. FIG. 16 is a diagram illustrating another example of information indicating a relationship between distance and wind temperature stored by a storage unit according to Modification 2 of Embodiment 1. Note that elements similar to those in FIGS. 5 and 10 are denoted with like signs, and detailed description of such elements will be reduced or omitted.

Compared to the computational unit 13 illustrated in FIG. 5, the computational unit 13B illustrated in FIG. 13 differs in that a human position estimation unit 133 and a wind temperature estimation unit 139 have been added, and the temperature calculation unit 130B, the storage unit 134B, and the thermal emission estimation unit 137B are configured differently. Herein, compared to the temperature calculation unit 130 illustrated in FIG. 5, the temperature calculation unit 130B does not include the human ambient temperature calculation unit 132. Otherwise, the configuration is the same as discussed earlier, and thus further description is omitted here.

As described in Modification 1, the human position estimation unit 133 estimates the position of the person 50 relative to the air conditioner 10, on the basis of a thermal image acquired by the thermal image acquisition unit 11 and the position of the thermal image acquisition unit 11 inside the air-conditioned space 60. For example, the human position estimation unit 133 estimates the position of the person 50 by using the position of the person's feet in a thermal image acquired by the thermal image acquisition unit 11, the height of the thermal image acquisition unit 11 from the floor 61 in the air-conditioned space 60, and the effective angular field of view (angle of view) of the thermal image acquisition unit 11. The method by which the human position estimation unit 133 estimates the position of the person 50 is as discussed earlier, and thus further description is omitted here.

The storage unit 134B stores information indicating a relationship between the wind speed and the convective heat transfer coefficient as discussed earlier, as well as information indicating a relationship between distance and wind temperature, as illustrated in FIGS. 14 and 15, for example. Herein, FIG. 14 illustrates an example in the summer, for example, and illustrates a relationship when the wind temperature of wind blown out from the air conditioner (20° C.) is lower than the room temperature (25° C.). Meanwhile, FIG. 15 illustrates an example in the winter, for example, and illustrates a relationship when the wind temperature of wind blown out from the air conditioner (23° C.) is higher than the room temperature (18° C.). As illustrated in FIG. 14, in times such as the summer, the wind temperature of wind blown out from the air conditioner at a constant wind temperature (25° C.) tends to increase as the distance increases. On the other hand, as illustrated in FIG. 15, in times such as the winter, the wind temperature of wind blown out from the air conditioner at a constant wind temperature (25° C.) tends to decrease as the distance increases.

The wind temperature estimation unit 139 estimates the wind temperature around the person 50 in the air-conditioned space 60, on the basis of the position of the person 50 estimated by the human position estimation unit 133, and the blow temperature at the outlet port of the air conditioner 10. More specifically, the wind temperature estimation unit 139 estimates the wind temperature around the person 50 on the basis of the position of the person 50 estimated by the human position estimation unit 133, and a blow temperature parameter set in the air conditioner 10. The blow temperature parameter prescribes the blow temperature at the outlet port of the air conditioner 10 that blows air into the air-conditioned space 60 to conduct air conditioning control.

In the present modification, the wind temperature estimation unit 139 is able to reference information indicating a relationship between wind temperature and distance stored in the storage unit 134B (for example, FIG. 14 or FIG. 15), treat the blow temperature parameter set in the air conditioner 10 as the blow temperature at the outlet port, and estimate the wind speed around the person 50 in the air-conditioned space 60 from the position of the person 50 estimated by the human position estimation unit 133 (distance L1).

Note that the wind temperature estimation unit 139 uses information indicating a relationship between wind temperature and distance stored in the storage unit 134B, as illustrated in FIG. 14 or FIG. 15, but is not limited thereto. For example, the wind temperature estimation unit 139 may also estimate the wind temperature around the person 50 in the air-conditioned space 60 by using information indicating a relationship between wind temperature dependent on wind speed and distance, as illustrated in FIG. 16 rather than FIG. 14, for example. This is because as the wind speed at the outlet port (initial speed) becomes slower, the wind becomes more susceptible to the effects of the room temperature. Also, the wind temperature estimation unit 139 is not limited to obtaining the blow temperature at the outlet port of the air conditioner 10 from the blow temperature parameter. A temperature measured by the temperature sensor 12 placed in a location such as the air intake port may also be used as the blow temperature at the outlet port. This is because in the air conditioner 10, air taken in from the air intake port is blown out from the outlet port, and thus the temperature of air taken in from the air intake port may be considered to correspond to the wind temperature of wind blown out from the outlet port.

The thermal emission estimation unit 137B estimates the human body thermal emission of the person 50 by using the wind temperature around the person 50 estimated by the wind temperature estimation unit 139 as the ambient temperature. In the present modification, the temperature of wind reaching the person 50 (wind temperature) is different from the ambient temperature of the air-conditioned space 60 (room temperature). For this reason, the thermal emission estimation unit 137B uses the temperature of wind reaching the person 50 (wind temperature), or in other words the wind temperature estimated by the wind temperature estimation unit 139, as the ambient temperature Ta in the above Formula 3. Also, the thermal emission estimation unit 137B treats the wall surface temperature Tr as being the same as the ambient temperature of the air-conditioned space 60 (room temperature), and uses a temperature measured by the temperature sensor 12 for the wall surface temperature Tr in the above Formula 2.

Note that other than the above-described, the configuration is the same as discussed earlier, and thus further description is omitted here.

According to the above configuration, the air conditioner of the present modification estimates the wind temperature, which is the temperature of wind blowing onto the person 50 (the temperature around the person 50 in the air-conditioned space 60), from the position of the person 50 estimated from a thermal image and a blow temperature parameter set in the air conditioner 10, and estimates the human body thermal emission.

Advantageous Effects of Modification 2

As above, by using information about a pre-calculated relationship between the wind speed and the distance, and information about a pre-calculated relationship between the wind temperature and the distance, the air conditioner 10 of the present modification is able to estimate the wind speed and the wind temperature around a person in an air-conditioned space from the position of the person 50 estimated from a thermal image and a blow parameter set in the air conditioner. Consequently, the air conditioner 10 of the present modification is able to make a more accurate estimation of the human body thermal emission that accounts for the effects of wind around the person, and is able to more accurately estimate the person's thermal sensation.

Consequently, the air conditioner 10 of the present modification is able to conduct air conditioning control of the air-conditioned space on the basis of the accurately estimated thermal sensation of the person to make the environmental temperature more comfortable for that person.

Note that although the present modification presupposes that wind blown by the air conditioner 10 continually blows onto the person 50 to estimate a human body thermal emission of the person 50 that accounts for the effects of wind and to estimate the thermal sensation of the person 50, the configuration is not limited thereto. For example, if wind blown by the air conditioner 10 blows onto the person 50 at some times and does not blow onto the person 50 at other times, these times may be accounted for to estimate the human body thermal emission.

Figure 17:
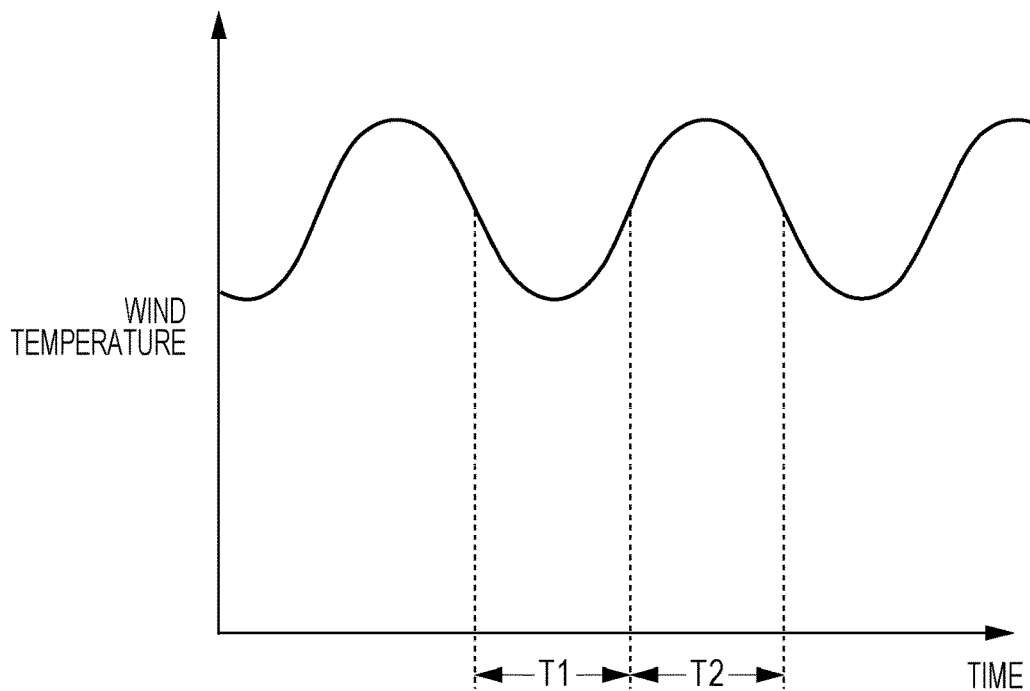
FIG. 17 is a diagram illustrating an example of information indicating a relationship between distance and time stored by a storage unit according to Modification 2 of Embodiment 1.

For example, if wind blown by the air conditioner 10 blows onto the person 50 at some times and does not blow onto the person 50 at other times, the wind temperature around the person 50 may vary as illustrated in FIG. 17, for example. FIG. 17 is a diagram illustrating an example of a relationship between wind temperature around the person 50 and time according to Modification 2 of Embodiment 1. Herein, FIG. 17 illustrates a relationship between wind temperature and time in a case in which the louver controlled by the air conditioner 10 is changing the wind direction on a fixed cycle. In FIG. 17, the time T1 corresponds to a time during which wind blown by the air conditioner 10 is not blowing onto the person 50, while the time T2 corresponds to a time during which wind blown by the air conditioner 10 is blowing onto the person 50.

In this case, the wind temperature estimation unit 139 may also estimate the time T1 during which wind blown by the air conditioner 10 is not blowing onto the person 50 and the time T2 during which the wind is blowing onto the person 50 on the basis of the louver scanning timings by the air conditioner 10. Additionally, the wind temperature estimation unit 139 may also estimate the human body thermal emission of the person 50 and estimate the thermal sensation by weighting the convective heat transfer coefficient and the wind temperature in the time T2 during which the wind is blowing onto the person 50 as well as the convective heat transfer coefficient and the wind temperature in the time T1 during which the wind is not blowing onto the person 50.

Modification 3

Embodiment 1 is described in terms of an example in which the wind speed of the air-conditioned space 60 is estimated from a blow parameter set in the air conditioner 10, but Embodiment 1 is not limited thereto. Modification 3 describes a case in which the wind speed of wind sent out from the air conditioner 10 is varied to thereby estimate the wind speed around the person 50 in the air-conditioned space 60 from the variation in the surface temperature of the person 50 at that time. For the sake of simplicity, the description hereinafter will suppose that the temperature of wind around the person 50 (wind temperature) is the same as the temperature of the air-conditioned space 60 (room temperature).

[Configuration of Computational Unit]

Figure 18:
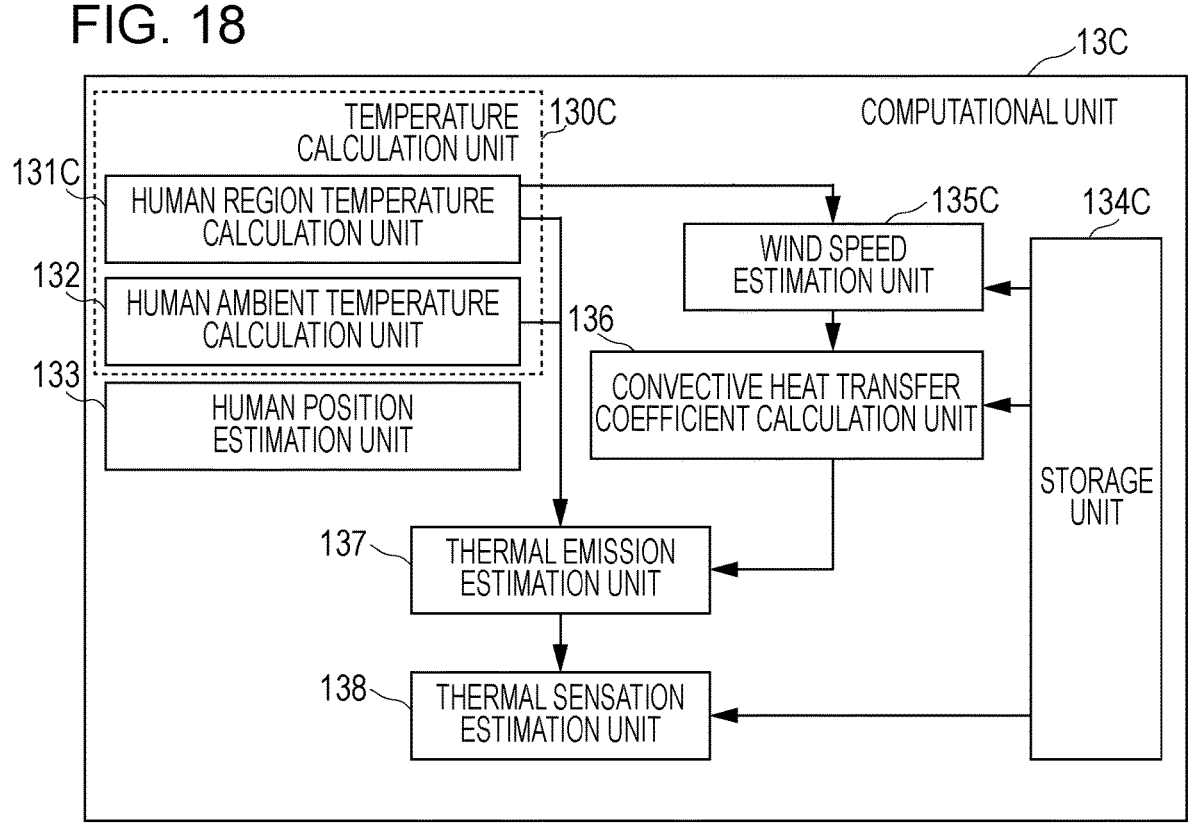
FIG. 18 is a diagram illustrating an example of a configuration of a computational unit according to Modification 3 of Embodiment 1.
Figure 19A:
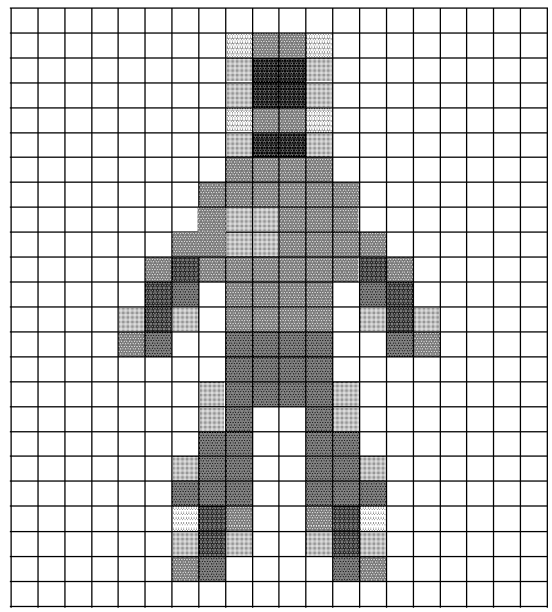
FIG. 19A is a diagram illustrating an example of a thermal image of a person according to Modification 3 of Embodiment 1.
Figure 19B:
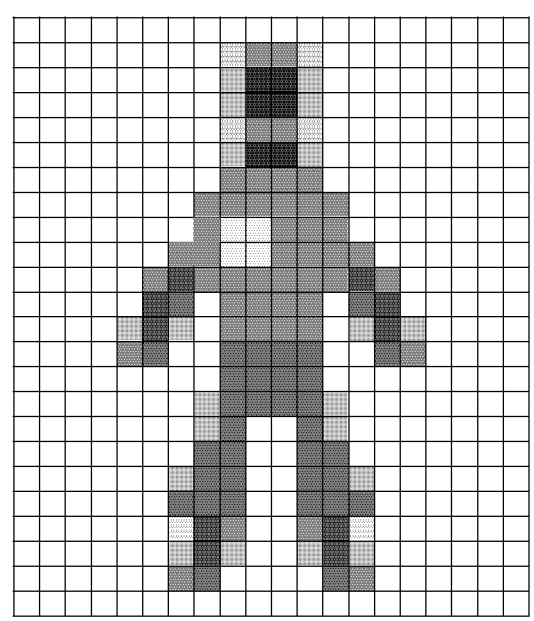
FIG. 19B is a diagram illustrating an example of a thermal image of a person according to Modification 3 of Embodiment 1.
Figure 20:
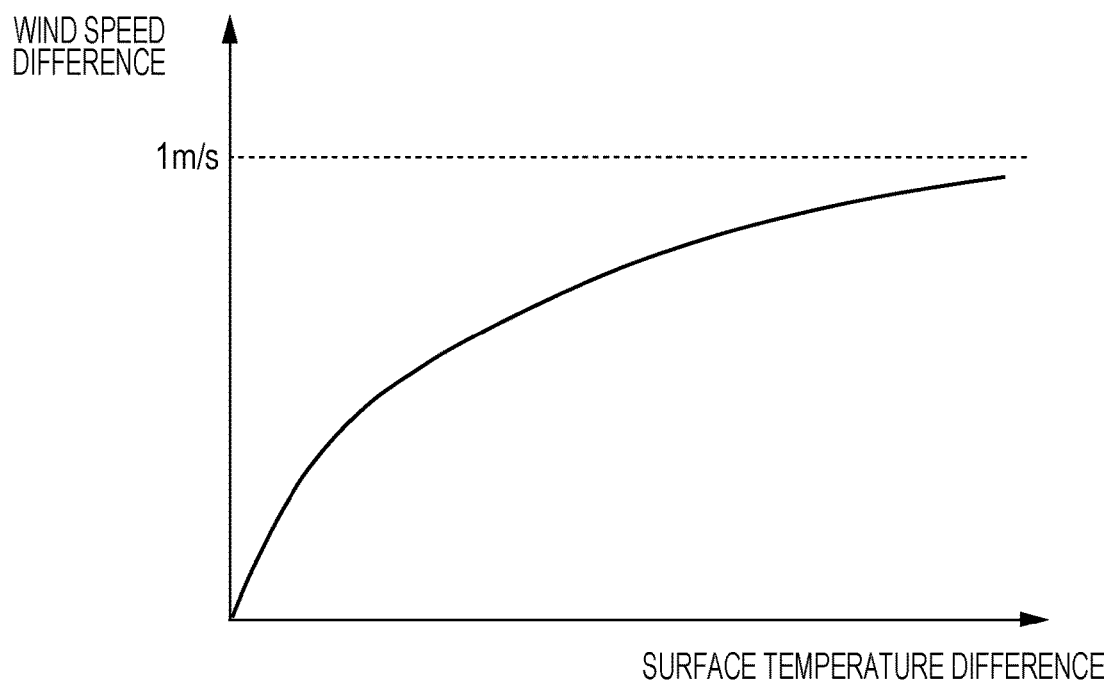
FIG. 20 is a diagram illustrating an example of information indicating a relationship between surface temperature difference of a person and wind speed difference stored by a storage unit according to Modification 3 of Embodiment 1.

FIG. 18 is a diagram illustrating an example of a configuration of a computational unit according to Modification 3 of Embodiment 1. FIGS. 19A and 19B are diagrams illustrating examples of a thermal image of a person according to Modification 3 of Embodiment 1. FIG. 20 is a diagram illustrating an example of information indicating a relationship between surface temperature difference of a person and wind speed difference stored by a storage unit according to Modification 3 of Embodiment 1. Note that elements similar to those in FIG. 5 are denoted with like signs, and detailed description of such elements will be reduced or omitted.

Compared to the computational unit 13 illustrated in FIG. 5, the computational unit 13C illustrated in FIG. 18 differs in that the temperature calculation unit 130C, the storage unit 134C, and the wind speed estimation unit 135C are configured differently.

The temperature calculation unit 130C is equipped with a human region temperature calculation unit 131C and a human ambient temperature calculation unit 132.

If the wind speed at the outlet port of the air conditioner 10 is varied, the human region temperature calculation unit 131C uses a thermal image acquired the thermal image acquisition unit 11 from before the variation in the wind speed at the outlet port and a thermal image acquired from the thermal image acquisition unit 11 after the variation in the wind speed at the outlet port to calculate the surface temperature of the person 50 before the variation and the surface temperature of the person 50 after the variation. Note that the wind speed at the outlet port of the air conditioner 10 may be varied by setting a blow parameter in the air conditioner 10.

Specifically, the human region temperature calculation unit 131C uses a thermal image acquired by the thermal image acquisition unit 11 when the wind speed at the outlet port of the air conditioner 10 is 1 m/s as illustrated in FIG. 19A, for example, and calculates the surface temperature of the person 50 when the wind speed is 1 m/s (before the variation). Subsequently, the human region temperature calculation unit 131C uses a thermal image acquired by the thermal image acquisition unit 11 when the wind speed at the outlet port of the air conditioner 10 is 2 m/s as illustrated in FIG. 19B, and calculates the surface temperature of the person 50 when the wind speed is 2 m/s (after the variation). According to this configuration, the human region temperature calculation unit 131C is able to calculate the surface temperature of the person 50 before and after the variation in the wind speed at the outlet port of the air conditioner 10.

Note that the example variation of the wind speed at the outlet port is not limited to these cases. For example, the wind speed at the outlet port may also be varied by setting a blow parameter in the air conditioner 10 so as to prescribe the wind speed at the outlet port to zero, and after that, prescribe the wind speed at the outlet port to a certain speed. The wind speeds at the outlet port before and after the variation may be any values insofar as the wind speeds enable the use of information indicating a relationship between the surface temperature difference of a person and the wind speed difference stored in a storage unit discussed later.

The storage unit 134C stores information indicating a relationship between the wind speed and the convective heat transfer coefficient as discussed earlier, as well as information indicating a relationship between the surface temperature difference of a person and the wind speed difference, as illustrated in FIG. 20, for example. The relationship illustrated in FIG. 20 is pre-calculated. FIG. 20 illustrates a trend of approaching the wind speed difference according to the blow parameter at the outlet port of the air conditioner 10 as the surface temperature difference of a person becomes larger.

The wind speed estimation unit 135C estimates the wind speed around the person 50 in the air-conditioned space 60, on the basis of the surface temperature of the person 50 before the variation in the wind speed at the outlet port of the air conditioner 10, and the surface temperature of the person 50 after the variation in the wind speed at the outlet port of the air conditioner 10.

In the present modification, the wind speed estimation unit 135C references information indicating a relationship between the surface temperature difference and the wind speed difference (for example, FIG. 20) stored in the storage unit 134C, and estimates the wind speed around the person 50 in the air-conditioned space 60 from the surface temperature of the person 50 before and after the variation in wind speed at the outlet port of the air conditioner 10 calculated by the human region temperature calculation unit 131C.

Note that the storage unit 134C may also be configured to store information indicating relationships between the surface temperature difference and the wind speed difference other than that of FIG. 20. In this case, the wind speed estimation unit 135C may select and reference information corresponding to the difference in the wind speed before and after the variation prescribed by a blow parameter set in the air conditioner 10 from among the information indicating relationships between the surface temperature difference and the wind speed difference stored in the storage unit 134C, on the basis of the blow parameter. The blow parameter prescribes the wind speed at the outlet port of the air conditioner 10 that blows air into the air-conditioned space 60 to conduct air conditioning control.

Note that other than the above-described, the configuration is the same as discussed earlier, and thus further description is omitted here.

In this way, in the air conditioner of the present modification, the wind speed of wind sent out from the air conditioner 10 is varied to thereby estimate the wind speed around the person 50 in the air-conditioned space 60 from the variation in the surface temperature of the person 50 at that time, and the human body thermal emission is estimated.

Advantageous Effects of Modification 3

As above, by using information about a pre-calculated relationship between the surface temperature difference of a person and the wind speed difference, the air conditioner of the present modification is able to estimate the wind speed around the person 50 in the air-conditioned space 60 from the variation in the surface temperature of the person 50 when the wind speed of wind sent out from the air conditioner 10 is varied. Consequently, the air conditioner of the present modification is able to make a more accurate estimation of the human body thermal emission that accounts for the effects of wind around the person, and is able to more accurately estimate the person's thermal sensation.

Consequently, the air conditioner of the present modification is able to conduct air conditioning control of the air-conditioned space on the basis of the accurately estimated thermal sensation of the person to make the environmental temperature more comfortable for that person.

Figure 21:
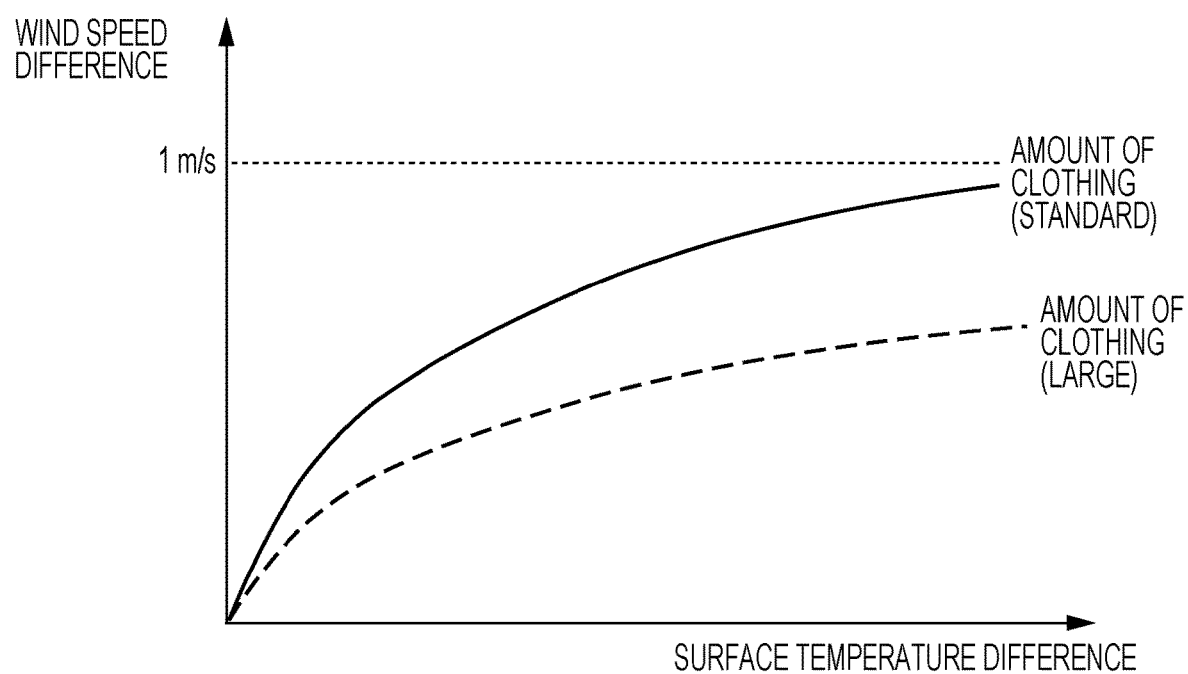
FIG. 21 is a diagram illustrating another example of information indicating a relationship between human surface temperature difference of a person and wind speed difference stored by a storage unit according to Modification 3 of Embodiment 1.

Note that the storage unit 134C may also be configured to store information indicating a relationship between the temperature difference and the wind speed difference depending on a person's amount of clothing, as illustrated in FIG. 21. FIG. 21 is a diagram illustrating another example of information indicating a relationship between the surface temperature difference of a person and the wind speed difference stored by a storage unit according to Modification 3 of Embodiment 1.

In this case, the human region temperature calculation unit 131C may be additionally configured to use a thermal image acquired by the thermal image acquisition unit 11 to calculate whether the amount of clothing worn by the person 50 is more or less than a standard amount of clothing. In addition, the wind speed estimation unit 135C may also reference information indicating a relationship between the surface temperature difference and the wind speed difference depending on a person's amount of clothing (for example, FIG. 21) stored in the storage unit 134C.

Consequently, the wind speed estimation unit 135C is able to reference the relevant information illustrated in FIG. 21, and estimate the wind speed around the person 50 on the basis of the surface temperature of the person 50 before and after the variation in the wind speed at the outlet port of the air conditioner 10 calculated by the human region temperature calculation unit 131C, and the amount of clothing worn by the person 50.

Modification 4

Embodiment 1 and Modifications 1 to 3 are described in terms of an example in which units such as the wind speed estimation unit 135 estimate the wind speed on the basis of a blow parameter set in the air conditioner 10 or a thermal image acquired by the thermal image acquisition unit 11, but the configuration is not limited thereto. The wind speed may also be estimated on the basis of information acquired from a device external to the air conditioner 10.

Figure 22A:
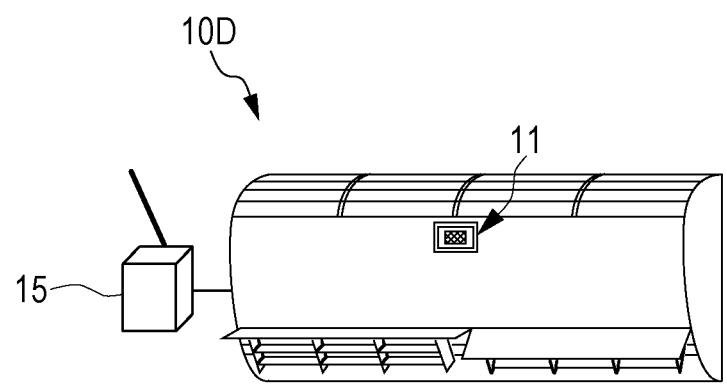
FIG. 22A is a diagram illustrating an example of a communication device connected to an air conditioner according to Modification 4 of Embodiment 1.
Figure 22B:
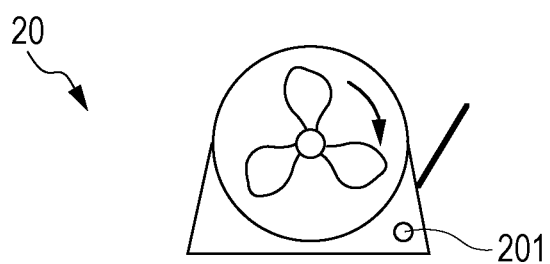
FIG. 22B is a diagram illustrating an example of a fan according to Modification 4 of Embodiment 1.

FIG. 22A is a diagram illustrating an example of a communication device connected to an air conditioner according to Modification 4 of Embodiment 1. FIG. 22B is a diagram illustrating an example of a fan according to Modification 4 of Embodiment 1.

Compared to the air conditioner 10 illustrated in FIG. 5, the air conditioner 10D illustrated in FIG. 22A differs in that a communication device 15 is connected, and the wind speed estimation unit (not illustrated) functions differently.

The communication device 15 wirelessly connects to and exchanges information with a fan 20 as illustrated in FIG. 22B. More specifically, the communication device 15 acquires the wind strength and wind direction of the fan 20 as information about the fan 20, for example, and transmits the acquired information to the air conditioner 10D.

The fan 20 is equipped with a communication unit (not illustrated) and an LED unit 201. The communication unit of the fan 20 is able to wirelessly connect to the communication device 15 and transmit information about the fan 20, such as the wind strength and the wind direction, to the communication device 15. The LED unit 201 may be configured to turn on when the communication unit of the fan 20 transmits information to the communication device 15, for example.

The wind speed estimation unit of the air conditioner 10D estimates the wind speed inside the air-conditioned space 60 on the basis of the wind strength of the fan 20 transmitted by the communication device 15.

Note that the air conditioner 10D additionally may be equipped with the human position estimation unit 133 described in Modification 1. In this case, the computational unit is able to estimate the position of the fan 20 by having the thermal image acquisition unit 11 of the air conditioner 10D acquire a thermal image while the LED unit 201 of the fan 20 is turned on. Consequently, the wind speed estimation unit of the air conditioner 10D is able to estimate the wind speed around the person 50 in the air-conditioned space 60 on the basis of the position of the fan 20 estimated by the human position estimation unit 133, the wind strength and wind direction of the fan 20 transmitted by the communication device 15, and the position of the person 50 estimated by the human position estimation unit 133.

Also, estimation of the wind speed on the basis of information acquired from a device external to the air conditioner 10D is not limited to the above example.

For example, the communication device 15 may also be wirelessly connected to a laser speckle flow meter installed externally to the air conditioner 10D. In this case, it is sufficient for the wind speed estimation unit of the air conditioner 10D to estimate the wind speed around the person 50 in the air-conditioned space 60 as being the wind speed measured by the laser speckle flow meter.

As another example, the communication device 15 may also be wirelessly connected to a remote control or a smartphone from which the air conditioner 10D may be operated and which includes a wind gauge. In this case, it is sufficient for the wind speed estimation unit of the air conditioner 10D to estimate the wind speed around the person 50 in the air-conditioned space 60 as being a measurement value from the wind gauge in the remote control or the smartphone transmitted by the communication device 15. This is because the person 50 conceivably operates the remote control or the smartphone held in his or her hand, and the wind gauge of the remote control or the smartphone may be assumed to measure the wind force around the person 50.

Additionally, although the present embodiment describes using an air conditioner in a room as an example, the configuration is not limited thereto. The location of use is not limited insofar the location is an air-conditioned space. For example, the air conditioner may also be used for situations such as automobile air conditioning or spot cooling in a factory. Automobile air conditioning and spot cooling in a factory presuppose that wind is blowing directly onto a person, and in the past, the wind direction has been controlled manually by the person, without estimating the thermal sensation. In contrast, according to an air conditioner of the present embodiment, the thermal sensation may be estimated accurately even if wind is blowing onto a person, and thus the wind direction may be controlled automatically. Consequently, since the user no longer needs to control the wind direction manually, the user is able to concentrate on driving the automobile or performing factory work.

Embodiment 2

Embodiment 1 describes a case of estimating the human body thermal emission under the assumption that the human body is only giving off heat and not receiving heat. Embodiment 2 describes an example of a case of estimating the human body thermal emission while accounting for the human body receiving heat from a source such as sunlight. Compared to the air conditioner 10 of Embodiment 1, the air conditioner 10E (not illustrated) according to Embodiment 2 differs in that the computational unit is configured differently. Thus, the configuration of the computational unit will be described hereinafter.

[Configuration of Computational Unit]

Figure 23:
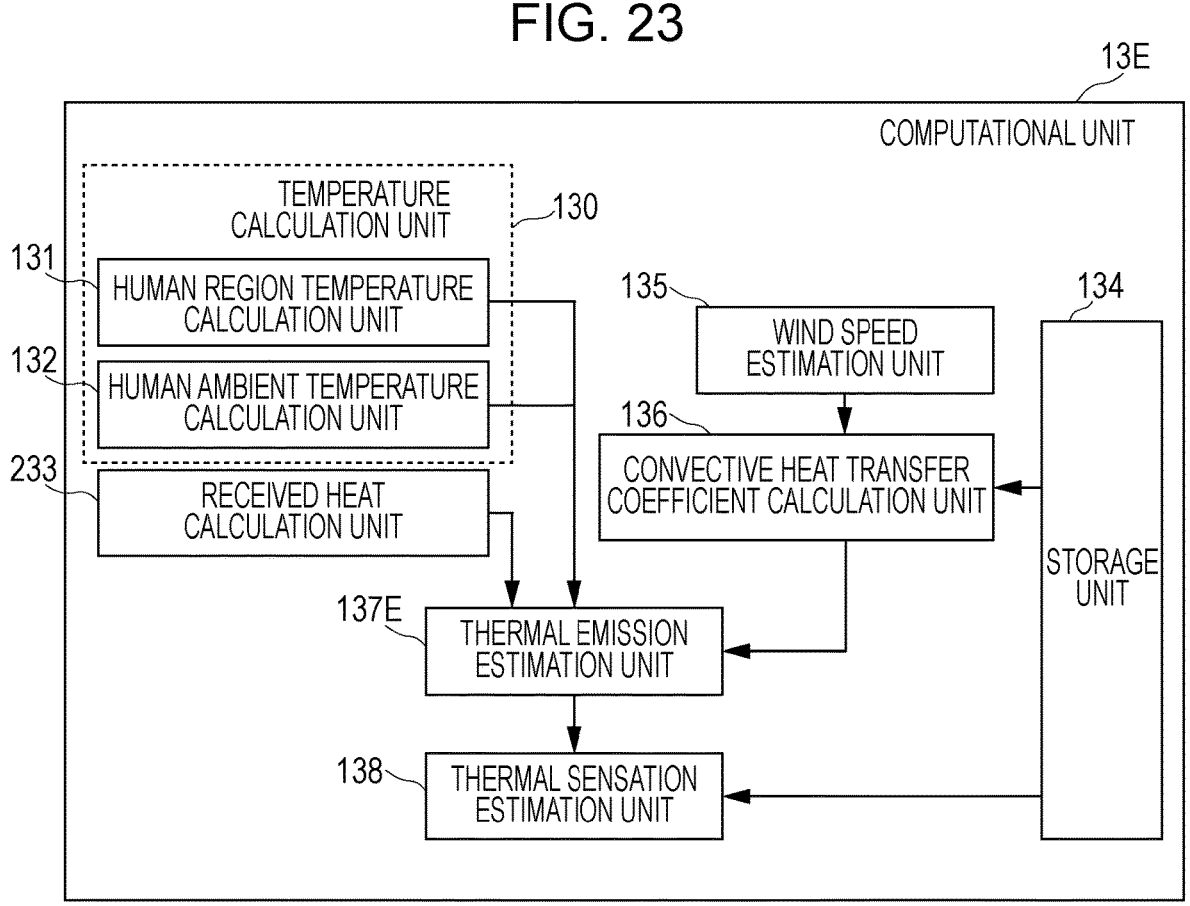
FIG. 23 is a diagram illustrating an example of a configuration of a computational unit of an air conditioner according to Embodiment 2.
Figure 24:
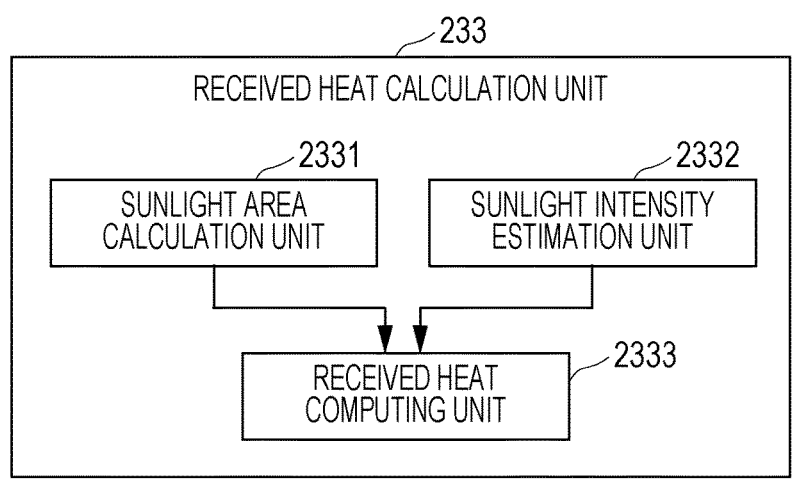
FIG. 24 is a diagram illustrating an example of a configuration of a received heat calculation unit according to Embodiment 2.

FIG. 23 is a diagram illustrating an example of a configuration of a computational unit of an air conditioner according to Embodiment 2. FIG. 24 is a diagram illustrating an example of a configuration of a received heat calculation unit according to Embodiment 2. Note that elements similar to those in FIG. 5 are denoted with like signs, and detailed description of such elements will be reduced or omitted.

Compared to the computational unit 13 illustrated in FIG. 5, the computational unit 13E illustrated in FIG. 23 differs in that a received heat calculation unit 233 has been added, and the thermal emission estimation unit 137E is configured differently.

As illustrated in FIG. 24, for example, the received heat calculation unit 233 includes a sunlight area calculation unit 2331, a sunlight intensity estimation unit 2332, and a received heat computing unit 2333. The received heat calculation unit 233 calculates the received heat, which is the amount of heat received by a person. Note that in the present embodiment, the received heat which is the amount of heat received by a person is described as being the received heat that a person receives from sunlight. The received heat that a person receives from sunlight may be expressed by the following Formula 5.

$$\text{(Received heat from sunlight)} \propto \text{(Sunlight intensity)} \times \text{(Clothing absorption ratio)} \times \text{(Sunlight area)} \quad \text{(Formula 5)}$$

The sunlight area calculation unit 2331 calculates the surface area of the part of the person on which sunlight is incident (sunlight area). The sunlight intensity estimation unit 2332 estimates the sunlight intensity on the person. The received heat computing unit 2333 calculates the received heat by using the sunlight intensity estimated by the sunlight intensity estimation unit 2332, the area calculated by the sunlight area calculation unit 2331, and a clothing absorption ratio for the person.

Figure 25:
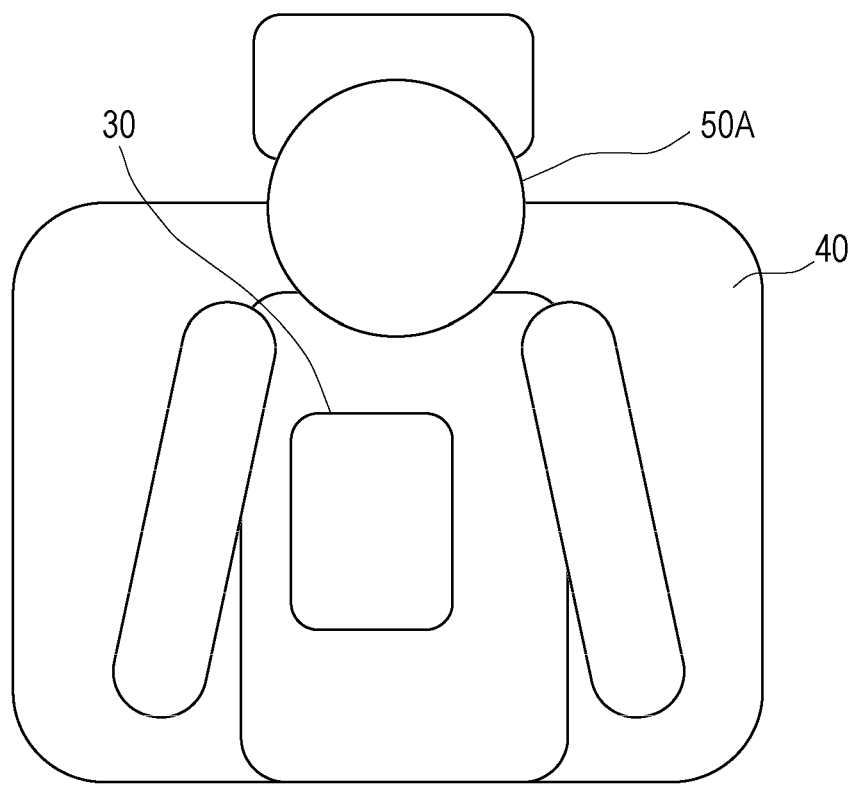
FIG. 25 is a diagram illustrating an example of how a person receives heat according to Embodiment 2.
Figure 26:
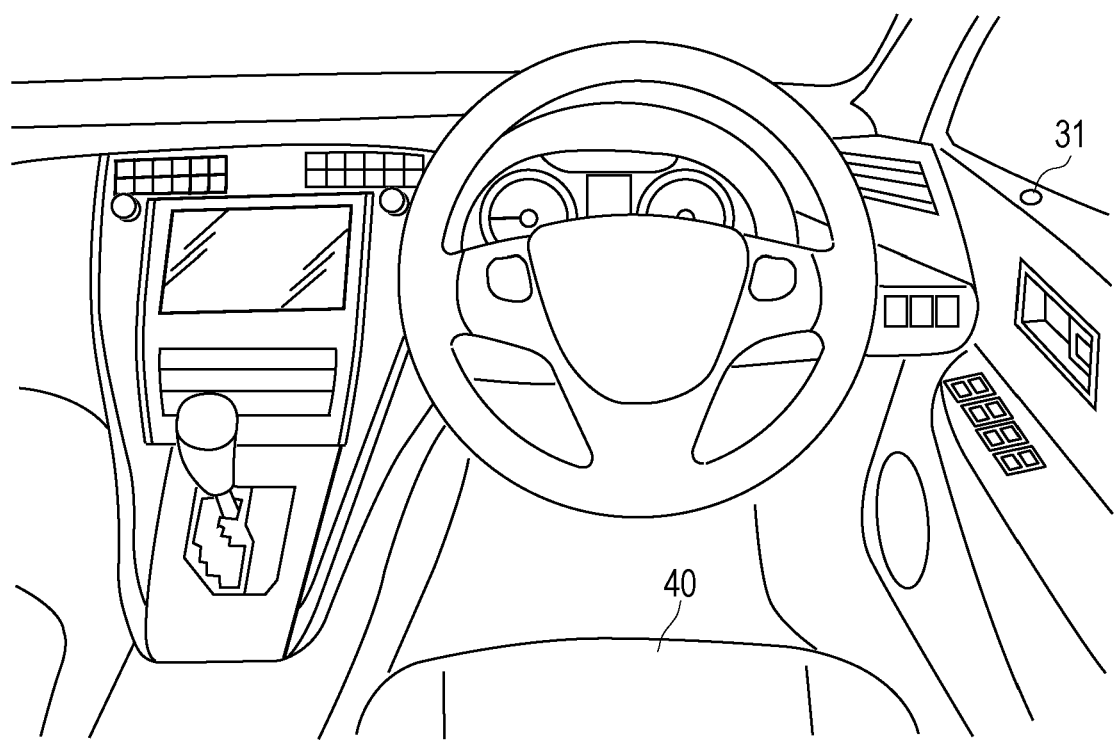
FIG. 26 is a diagram illustrating an example of a position where a sunlight sensor is affixed according to Embodiment 2.

At this point, FIGS. 25 and 26 will be used to describe an example of a method of calculating the received heat, which is the amount of heat received by a person 50A. FIG. 25 is a diagram illustrating an example of how a person receives heat according to Embodiment 2. FIG. 26 is a diagram illustrating an example of a position where a sunlight sensor is affixed according to Embodiment 2. FIG. 25 illustrates a situation in which the person 50A is sitting in the seat 40 of a vehicle such as a car, and sunlight is shining in from a window such as the windshield onto a region 30. In addition, in the scene illustrated in FIG. 25, the air conditioner 10E according to Embodiment 2 is installed on board the air conditioning system of the vehicle, and is connected in a wired or wireless manner to the sunlight sensor 31 illustrated in FIG. 26.

The sunlight sensor 31 is placed below the side window of a door on the vehicle, or in other words on the top surface (upper edge) of the door trim, as illustrated in FIG. 26, for example, and senses the sunlight intensity. Consequently, the air conditioner 10E is able to acquire the sunlight intensity sensed by the sunlight sensor 31.

The sunlight intensity estimation unit 2332 estimates the sunlight intensity on a person on the basis of the sunlight intensity acquired by the sunlight sensor 31. In the base illustrated in FIG. 25, the sunlight intensity estimation unit 2332 estimates the sunlight intensity acquired by the sunlight sensor 31 as being the sunlight intensity on the person 50A. The sunlight area calculation unit 2331 calculates the surface area of the region 30 as the area of the part of the person on which light is incident (sunlight area). At this point, the sunlight area calculation unit 2331 may also calculate the surface area of the region 30 on the basis of a thermal image including the person 50A acquired from the thermal image acquisition unit 11. In this case, the sunlight area calculation unit 2331 may calculate the surface of the region 30 by taking the region 30 to be the portion having a higher temperature than the surface temperature of the person 50A among the region recognized as the person 50A in a thermal image including the person 50A. Note that the sunlight area calculation unit 2331 may also calculate the surface area of the region 30 from a property such as brightness, on the basis of an image acquired by a visible light camera installed in a location such as the rear-view mirror of the vehicle.

In addition, the received heat computing unit 2333 is able to estimate the clothing reflection ratio of the person 50A, on the basis of RGB values in an image acquired by a visible light camera installed in a location such as the rear-view mirror of the vehicle. At this point, since the clothing absorption ratio of the person 50A is equal to 1 minus the clothing reflection ratio of the person 50A, the received heat computing unit 2333 is able to compute the clothing absorption ratio of the person 50A. Note that the received heat computing unit 2333 may also estimate the clothing reflection ratio of the person 50A on the basis of RGB values in an image acquired by a visible light camera while the indoor lighting of the vehicle is turned on. This is because the emission spectrum of the indoor lighting of the vehicle is known in advance, and thus an advantageous effect of obtaining a more accurate clothing reflection ratio is exhibited.

In addition, the received heat computing unit 2333 may also compute the clothing reflection ratio to be 50%, for example. This is because, although dependent on the color of clothing, the clothing reflection ratio is ordinarily computed within a range from 40% to 60%, and thus computing the clothing reflection ratio to be 50% does not produce a large error. Obviously, some other value in the vicinity of 50% may also be set.

In this way, the received heat computing unit 2333 is able to calculate the received heat of the person 50A by using the sunlight intensity estimated by the sunlight intensity estimation unit 2332, the surface area of the region 30 calculated by the sunlight area calculation unit 2331, and the estimated clothing absorption ratio of the person 50A.

The thermal emission estimation unit 137E estimates the human body thermal emission of the person 50A by using the convective heat transfer coefficient calculated by the convective heat transfer coefficient calculation unit 136, the ambient temperature which is the temperature of the regions other than the person 50A in the air-conditioned space 60, the surface temperature of the person 50A calculated by the temperature calculation unit 130, and the received heat estimated by the received heat calculation unit 233.

A method of estimating the human body thermal emission while accounting for the human body receiving heat will now be described.

Such human body thermal emission may be expressing according to Formula 6 by using the received heat α of a person.

$$H'\ [W/m^2] = R + C + K + Esk + Eres + Cres - \alpha \qquad \text{(Formula 6)}$$

Herein, H represents the human body thermal emission, R the radiation from the human body, C the convection (heat transfer from the human body to the air), K the conduction, Esk the water evaporation from the skin of the human body, Eres the respiratory water evaporation of the human body, and Cres the respiratory convection.

In other words, the human body thermal emission H' that accounts for the human body receiving heat may be calculated by subtracting the received heat α of the person from the human body thermal emission H according to Embodiment 1.

Consequently, by using the received heat estimated by the received heat calculation unit 233, the thermal emission estimation unit 137E is able to estimate the human body thermal emission of the person 50A according to a method similar to Embodiment 1.

Advantageous Effects of Embodiment 2

As above, in the air conditioner 10E of Embodiment 2, a human body thermal emission that also accounts for the effects of heat received from sources such as sunlight may be estimated by additionally estimating the received heat from sunlight. Consequently, since the air conditioner 10 is able to estimate a person's thermal sensation more accurately, even when sunlight is shining on that person, the air conditioner 10E is able to conduct air conditioning control of the air-conditioned space 60 on the basis of the accurately estimated thermal sensation of the person to make the environmental temperature more comfortable for that person.

Note that although Embodiment 2 describes an example in which the air conditioner 10E is installed on board a car, the configuration is not limited thereto. The air conditioner 10E may also be installed in air conditioning equipment in a room where the human body may possibly receive heat from a source such as sunlight, or be installed in an air conditioning system on board a train.

Figure 27:
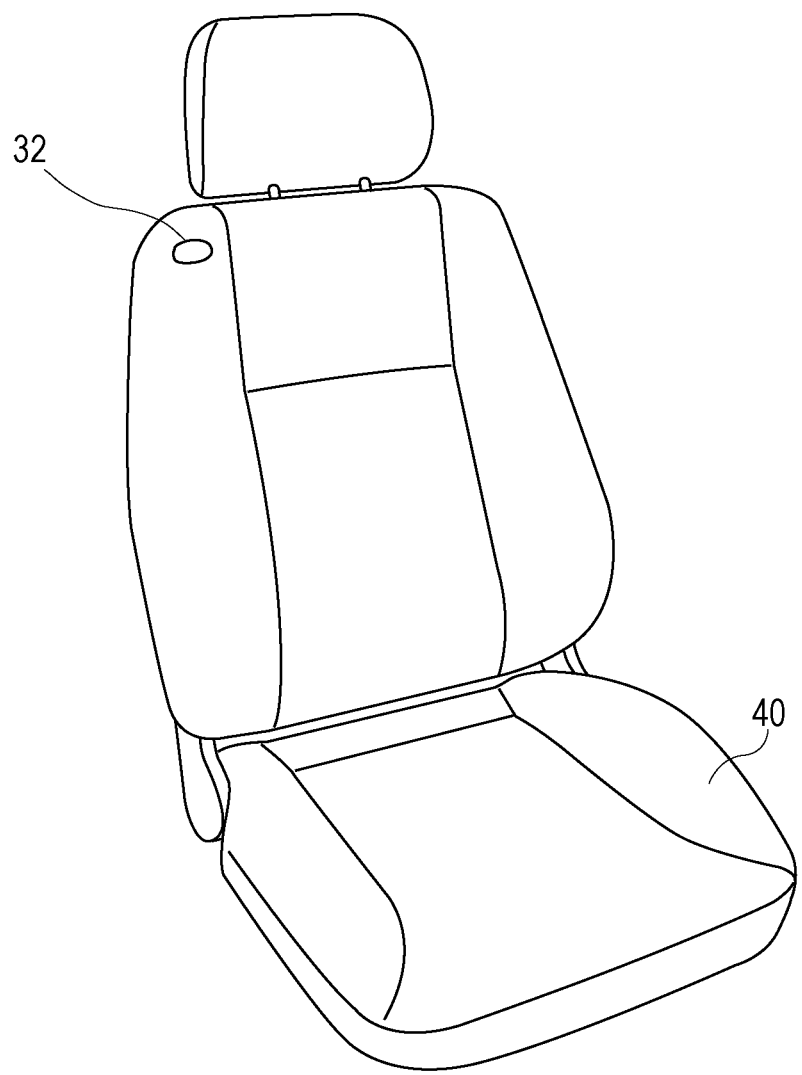
FIG. 27 is a diagram illustrating another example of a position where a sunlight sensor is affixed according to Embodiment 2.

In addition, the sunlight sensor is not limited to being placed on the top surface (upper edge) of the door trim as illustrated in FIG. 26. For example, the sunlight sensor may be placed somewhere on the seat 40 not obscured by the person 50A, as illustrated in FIG. 27. FIG. 27 is a diagram illustrating another example of a position where a sunlight sensor is installed according to Embodiment 2.

As illustrated in FIG. 27, by placing a sunlight sensor 32 on the upper extremity of the seat 40, or in other words, at a position higher than the shoulders of the person 50A when the person 50A sits down, the sunlight sensor 32 may be placed at a position on the seat 40 not obscured by the person 50A. Consequently, the sunlight sensor 32 is placed at a position closer to the person 50A, and thus is able to sense a sunlight intensity that is closer to the sunlight intensity received by the person 50A.

Note that the position where the sunlight sensor is placed is not limited to the above example. As another position on the seat 40 not obscured by the person 50A, the sunlight sensor may also be placed on the seatbelt (not illustrated) of the seat 40, on the side facing the windshield. Consequently, the sunlight sensor 32 is placed at a position closer to the person 50A, and thus is able to sense a sunlight intensity that is closer to the sunlight intensity received by the person 50A.

In addition, one or multiple temperature sensors may also be provided in regions of the seat 40 contacted by the person 50A, and the temperature sensed by each may be transmitted to the thermal emission estimation unit 137E. This is because as a result of the person 50A sitting in the seat 40, the regions contacted by the person 50A become large compared to the sites on the underside of the feet in Embodiment 1, and thus the effects of thermal emission by conduction K in Formula 6 become greater. Consequently, the thermal emission estimation unit 137E is able to estimate the temperature variation in the regions contacted by the person 50A while the person 50A is sitting down, and the thermal emission due to conduction to these regions after the person 50A sits down. In other words, it is possible to estimate the thermal emission more accurately by accounting for the thermal emission due to conduction K from the regions contacted by the person 50A, in addition to the effects of heat received from sunlight.

Modification 1

Figure 28:
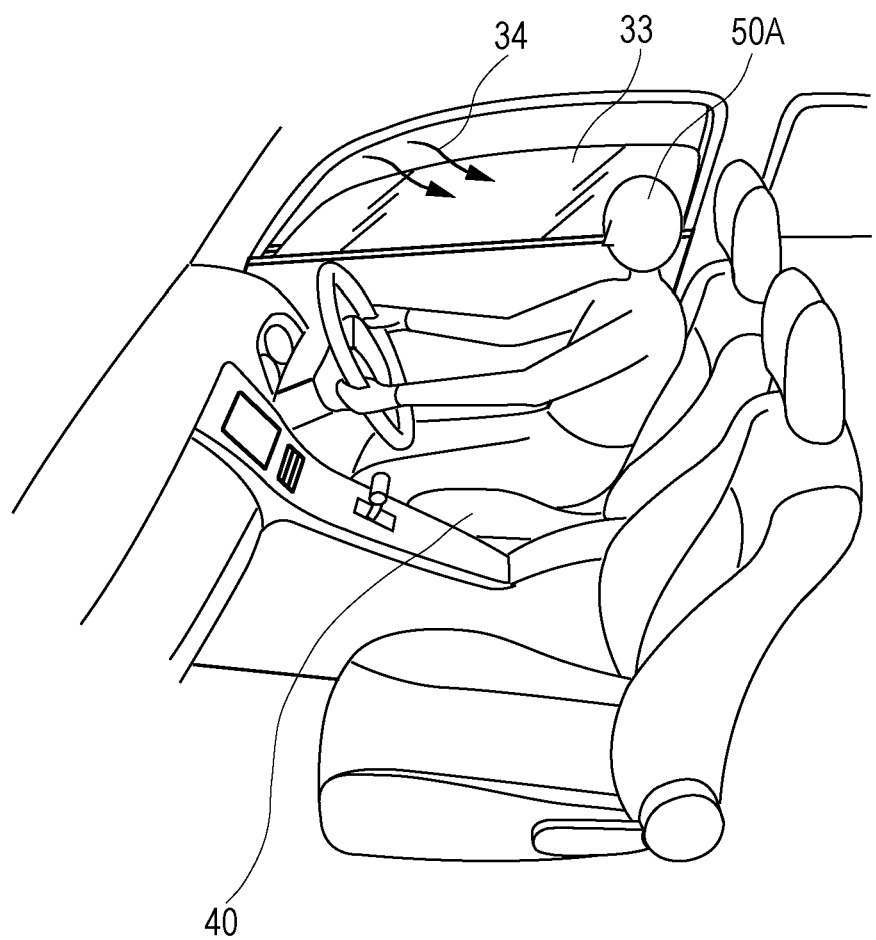
FIG. 28 is a diagram illustrating an example of an opening degree of a vehicle window estimated by an air conditioner according to Modification 1 of Embodiment 2.

FIG. 28 is a diagram illustrating an example of an opening degree of a vehicle window estimated by the air conditioner 10E according to Modification 1 of Embodiment 2.

For example, if a vehicle is traveling with a window 33 of the vehicle in an open state as illustrated in FIG. 28, the human body thermal emission of the person 50A is affected not only by the wind blown by the air conditioner 10E, but also the wind 34 from the open window 33. In this case, it is sufficient for the computational unit 13E to additionally estimate the opening degree of the vehicle window 33 from a thermal image acquired by the thermal image acquisition unit 11. Additionally, the computational unit 13E may also estimate the wind speed around the person 50A from the speed of the vehicle, and estimate the surface area of the wind blowing onto the person 50A from the estimated opening degree of the window 33, for example.

In this way, according to the present modification, the air conditioner 10E is able to estimate the human body thermal emission while accounting for the wind speed and surface area of wind blowing onto the person 50A due to the opening degree of the window 33 of the vehicle. Consequently, since the air conditioner 10 is able to estimate a person's thermal sensation more accurately, even when the vehicle is traveling with the window 33 of the vehicle in an open state, the air conditioner 10E is able to conduct air conditioning control of the air-conditioned space 60 on the basis of the accurately estimated thermal sensation of the person to make the environmental temperature more comfortable for the person 50A.

Note that the air conditioner 10E may also be configured to conduct air conditioning control of the air-conditioned space by automatically opening and closing the window 33 on the basis of the estimated thermal sensation of the person 50A, rather than controlling parts such as the louver.

Consequently, by not only conducting air conditioning control of the air-conditioned space while accounting for the opening degree of the window 33, but also taking in natural wind, the air conditioner 10E is able to save power, and exhibit additional advantageous effects of moderating decreases in oxygen concentration inside the vehicle, and preventing drowsiness.

Modification 2

Figure 29:
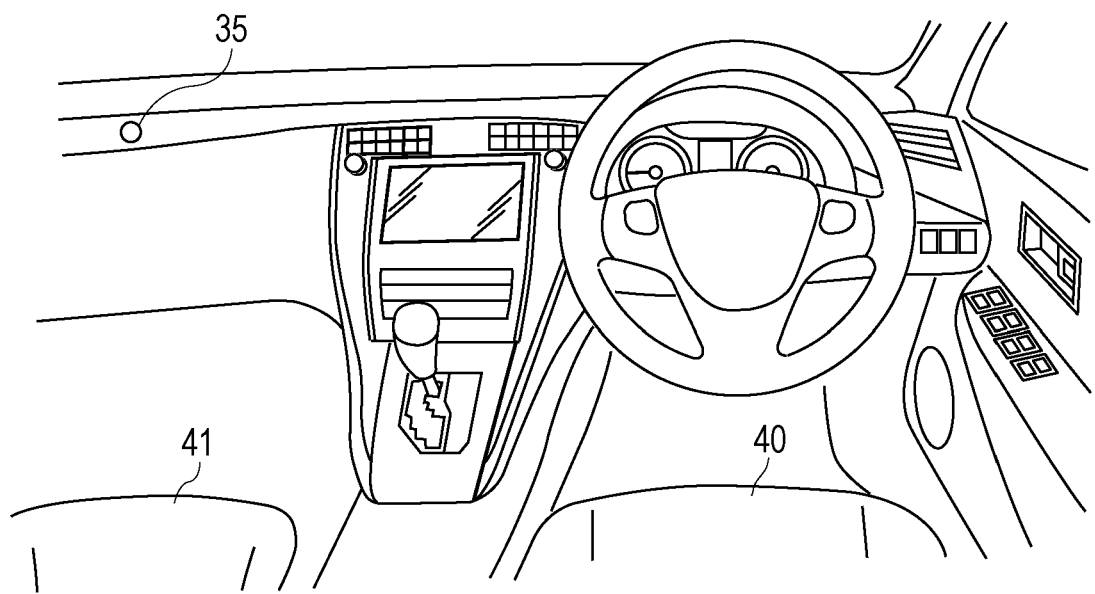
FIG. 29 is a diagram illustrating an example of a position where a thermographic camera is installed according to Modification 2 of Embodiment 2.

FIG. 29 is a diagram illustrating an example of a position where a thermographic camera 35 is installed according to Modification 2 of Embodiment 2.

For example, as illustrated in FIG. 29, the thermographic camera 35 may be installed on the passenger side of the vehicle (the side of a seat 41 opposite the seat 40 of the person 50A), and acquire a thermal image of the side of the person 50A by photographing the side of the person 50A. Herein, the thermographic camera 35 may be the thermal image acquisition unit 11, or be installed separately from the thermal image acquisition unit 11. Consequently, since the angle of view can be compensated even inside a narrow vehicle, the human region temperature calculation unit 131 is able to more accurately calculate the average temperature (average skin temperature) of the region recognized as the person 50A (human region) in the thermal image.

In this way, according to the present modification, even an air conditioner 10E installed inside a vehicle is able to more accurately calculate the ambient temperature and the average temperature, and thus is able to estimate the human body thermal emission more accurately. Consequently, since the air conditioner 10E of the present modification is able to estimate a person's thermal sensation accurately, the air conditioner 10E is able to conduct air conditioning control of the air-conditioned space on the basis of the accurately estimated thermal sensation of the person to make the environmental temperature more comfortable for that person.

Modification 3

Figure 30:
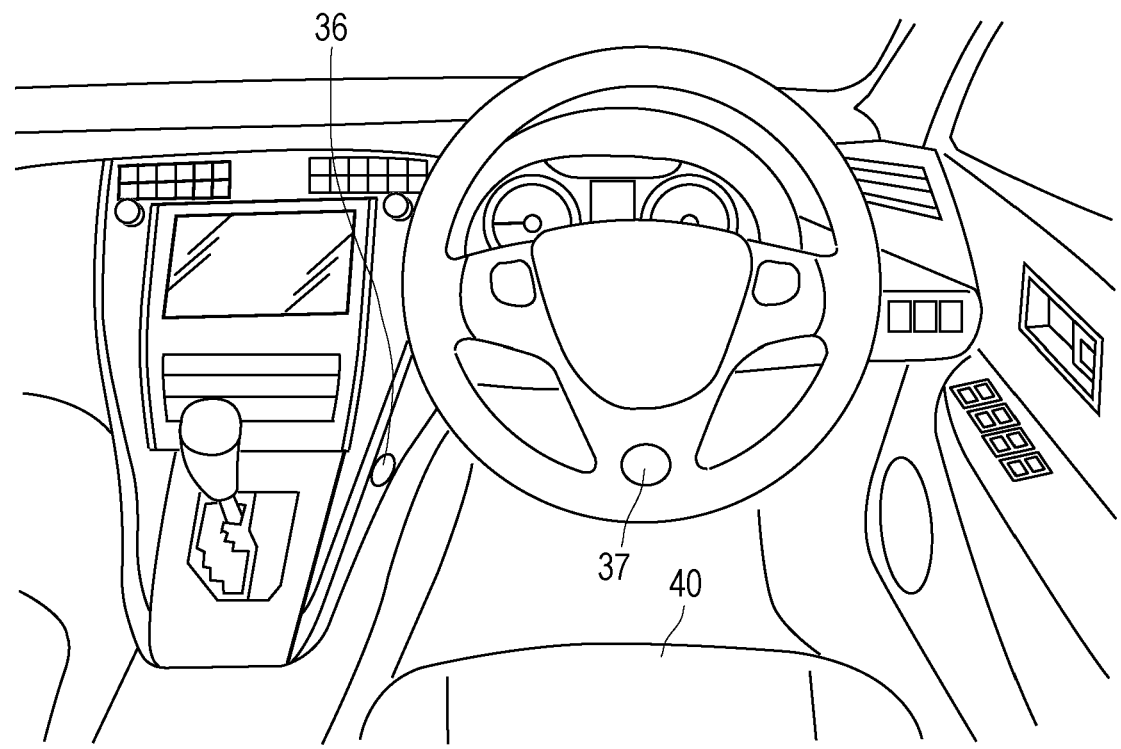
FIG. 30 is a diagram illustrating an example of a position where a contactless temperature sensor is installed according to Modification 3 of Embodiment 2.

FIG. 30 is a diagram illustrating an example of a position where a contactless temperature sensor is installed according to Modification 3 of Embodiment 2.

For example, as illustrated in FIG. 30, a contactless temperature sensor may be placed at a position such as near the dashboard of the vehicle (for example, the position 36) or near the center of the steering wheel (for example, the position 37), and measure the skin temperature of the lower extremity of the person 50A. Additionally, the human region temperature calculation unit 131 may treat the lower extremity temperature measured by the contactless temperature sensor as being the surface temperature (average skin temperature: Tcl) of the person 50A. This is because the temperature of a person's femoral region is considered to be close to the person's average skin temperature.

In this way, according to the present modification, by using the lower extremity temperature as a substitute rather than calculating the surface temperature (average skin temperature) of the person 50A from a full-body thermal image, the air conditioner 10E is able to estimate the human body thermal emission of the person 50A easily. Consequently, the air conditioner 10E of the present modification is able to estimate the thermal sensation of the person 50A easily and accurately, even when the air conditioner 10E is installed inside a vehicle. The air conditioner 10E of the present modification is able to conduct air conditioning control of the air-conditioned space on the basis of the accurately estimated thermal sensation of the person to make the environmental temperature more comfortable for the person 50A.

Note that the method of measuring the temperature of the lower extremity of the person 50A is not limited to the above case. For example, a thermometer may be placed on the seating face of the seat 40 and measure the temperature on the underside of the femoral region of the person 50A. Note that in this case, since the underside of the femoral region of the person 50A contacts the seating face of the seat 40, it is anticipated that a higher temperature than the surface temperature (average skin temperature) of the person 50A will be measured in some cases. In this case, a correction may be made, such as subtracting the temperature increase due to contact between the underside of the femoral region of the person 50A and the seating face of the seat 40 from the temperature measured by the thermometer.

Modification 4

Figure 31:
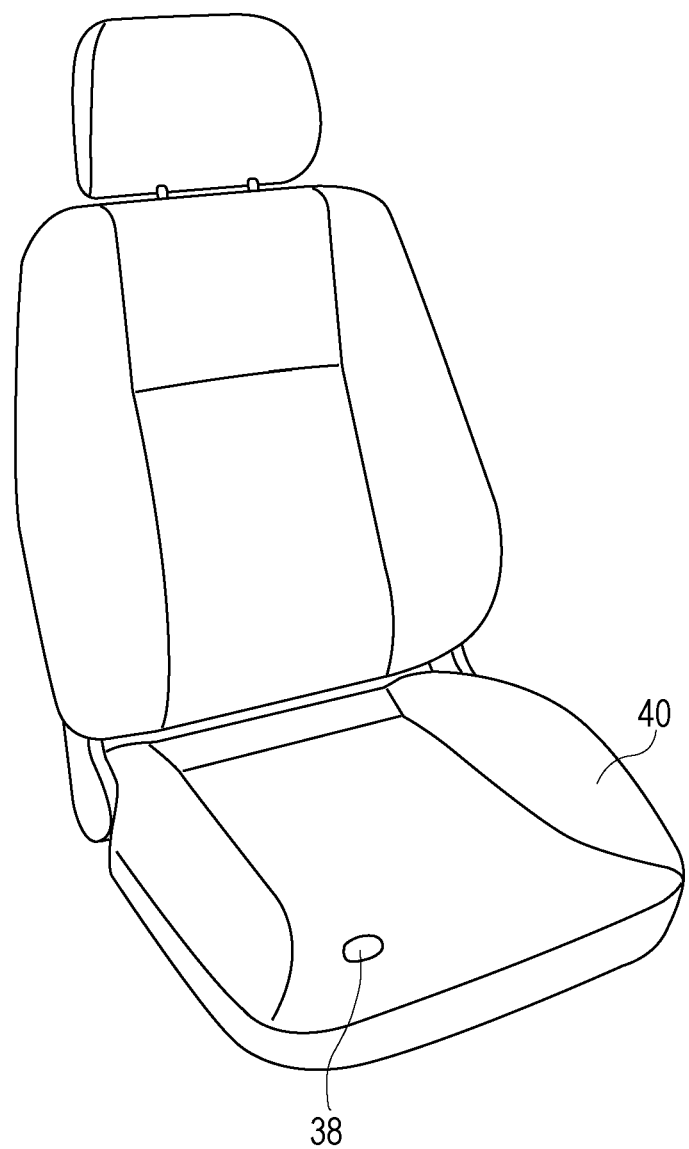
FIG. 31 is a diagram illustrating an example of a position where a hygrometer is installed according to Modification 4 of Embodiment 2.

FIG. 31 is a diagram illustrating an example of a position where a hygrometer is installed according to Modification 4 of Embodiment 2.

For example, as illustrated in FIG. 31, a hygrometer may be installed on the seating face of the seat 40 (for example, the position 38), and detect the degree of perspiration of the person 50A.

Consequently, the air conditioner 10E of the present modification is able to detect perspiration due to a sudden rise in the humidity of the person 50A, on the basis of the hygrometer detection result.

Consequently, the air conditioner 10E of the present modification is able to estimate the seating comfort of the seat 40 for the person 50A on the basis of the hygrometer detection result, in addition to estimating the thermal sensation of the person 50A.

Note that although the present embodiment describes application on board a car as an example, the configuration is not limited thereto. For example, application is also possible to situations such as inside a train or airplane, spot cooling in a sunny outdoor area or sunny environment, or even indoors in a room that takes in much sunlight.

The foregoing thus describes an air conditioner and a thermal sensation estimation method according to one or more aspects of the present disclosure on the basis of the embodiments, but the present disclosure is not limited to these embodiments. Embodiments obtained by applying various modifications that may occur to persons skilled in the art as well as embodiments constructed by combining the structural elements in different embodiments may also be included within the scope of the one or more exemplary embodiments of the present disclosure, insofar as such embodiments do not depart from the spirit of the present disclosure. For example, cases such as the following are also included in the present disclosure.

(1) The foregoing embodiments describe an air conditioner equipped with at least a temperature sensor, a thermal image acquisition unit, a computational unit, and a control unit. However, some structural elements of the air conditioner, such as the thermal image acquisition unit and the computational unit 13, may also be configured separately as software. In this case, the primary agent that processes such software may be the computational unit of the air conditioner, a computational unit included in a device such as a personal computer (PC) or a smartphone, or in equipment such as a cloud server connected to the air conditioner over a network. In addition, part of the configuration, such as the thermal image acquisition unit and the computational unit, may also be configured separately from the air conditioner. In other words, a sensor system equipped with at least the thermal image acquisition unit and the computational unit described in the foregoing embodiments may also be configured.

(2) The above devices are specifically computer systems made up of a microprocessor, ROM, RAM, a hard disk unit, a display unit, a keyboard, a mouse, and the like. A computer program is stored in the RAM or the hard disk unit. Each device achieves the respective functions thereof as a result of the microprocessor operating in accordance with the computer program. The computer program herein is made up of a plural combination of instruction codes indicating commands to the computer in order to achieve a designated function.

(3) Some or all of the structural elements constituting each of the above devices may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is stored in the RAM. The system LSI chip achieves the functions thereof as a result of the microprocessor operating in accordance with the computer program.

(4) Some or all of the structural elements constituting each of the above devices may also be configured as an IC card or a separate module that may be inserted into each device. The IC card or module is a computer system made up of a microprocessor, ROM, RAM, and the like. The IC card or module may also include the advanced multi-function LSI chip discussed above. The IC card or module achieves the functions thereof as a result of the microprocessor operating in accordance with the computer program. The IC card or the module may also be tamper-resistant.

(5) The present disclosure may also taken to be the methods indicated in the foregoing. In addition, these methods may be taken to be a computer program realized by a computer, or a digital signal containing a computer program.

In addition, the present disclosure may also be realized by recording a computer program or digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, the present disclosure may also be taken to be the digital signal recorded on these recording media.

In addition, the present disclosure may also be realized by transmitting a computer program or a digital signal over an electrical communication link, a wired or wireless communication link, a network such as the Internet, or a data broadcast.

In addition, the present disclosure may also be a computer system equipped with a microprocessor and memory, in which the memory stores the above computer program, and the microprocessor operates according to the computer program.

In addition, the present disclosure may also be carried out by another independent computer system by recording and transporting a program or a digital signal on a recording medium, or transporting a program or a digital signal over a network or the like.

(6) The foregoing embodiments and the foregoing modifications may also be combined with each other.

The present disclosure may be utilized in a sensing method, a sensing system, and air conditioning equipment equipped with the same, and more particularly, the present disclosure may be utilized in a sensing method or sensing system installed on board air conditioning equipment such as a pet air conditioner, a monitoring air conditioner, or a health air conditioner, as well as to air conditioning equipment equipped with the same.

The present disclosure may be utilized in an air conditioner that conducts air conditioning control of an air-conditioned space and a thermal sensation estimation method, and more particularly, the present disclosure may be utilized in an air conditioner and a thermal sensation estimation method which are installed in the air conditioning system of a vehicle or individual air conditioning equipment in an office, and which conduct air conditioning control of an air-conditioned space on the basis of the thermal sensation of a person in the air-conditioned space.

What is claimed is:

1. An air conditioner comprising:
  at least one of an infrared detector or a thermal camera to acquire a thermal image at a direction of wind emitted from the air conditioner,
  (i) wherein the infrared detector is configured to detect a temperature within an air-conditioned space to acquire, as the thermal image, a first thermal image including pixels indicating a temperature distribution inside the air-conditioned space, wherein each of the pixels is associated with the infrared detector, or (ii) wherein the thermal camera is configured to capture the air-conditioned space to acquire, as the thermal image, a second thermal image indicating the temperature distribution inside the air-conditioned space;

a processor that estimates a human body thermal emission of a person in the air-conditioned space based on at least (i) the thermal image including the person in the air-conditioned space and (ii) a wind speed of the wind emitted from the air conditioner with respect to a location of the person in the air-conditioned space; estimates a thermal sensation of the person in the air-conditioned space based on the estimated human body thermal emission of the person in the air-conditioned space; and a controller that conducts air conditioning control of the air-conditioned space controlling at least one of a compressor, a fan and a louver of the air conditioner to control at least one of a wind temperature, the wind speed and the wind direction to produce hot or cold air emitted from the air conditioner based on the thermal sensation of the person in the air-conditioned space.

2. The air conditioner according to claim 1, further comprising:

a wind speed estimator
that includes a processor, and
that estimates a wind speed inside the air-conditioned space, wherein
the wind speed estimator estimates the wind speed inside the air-conditioned space based on a blow parameter set in the air conditioner, the blow parameter prescribing the wind speed at an outlet port of the air conditioner that blows air into the air-conditioned space to conduct air conditioning control, and
the processor of the air conditioner estimates the thermal sensation of the person based on the thermal image and the wind speed estimated by the wind speed estimator.

3. The air conditioner according to claim 2, wherein the processor of the air conditioner
estimates the human body thermal emission of the person based on the thermal image and the wind speed estimated by the wind speed estimator.

4. The air conditioner according to claim 3, furthermore comprising:

a temperature calculator
that includes a processor, and
that calculates a surface temperature of the person by using the thermal image; and
a convective heat transfer coefficient calculator that calculates a convective heat transfer coefficient based on the wind speed estimated by the wind speed estimator, wherein
the processor of the air conditioner estimates the human body thermal emission of the person by using the convective heat transfer coefficient calculated by the convective heat transfer coefficient calculator, an ambient temperature that is a temperature of regions other than the person in the air-conditioned space, and the surface temperature of the person calculated by the temperature calculator.

5. The air conditioner according to claim 4, further comprising:

a human position estimator
that includes a processor, and
that estimates a position of the person relative to the air conditioner based on the thermal image acquired and a position of the infrared detector or the thermal camera inside the air-conditioned space, wherein
the wind speed estimator estimates the wind speed around the person in the air-conditioned space based on the position of the person estimated by the human position estimator, and the blow parameter, and
the convective heat transfer coefficient calculator calculates the convective heat transfer coefficient of the person based on the wind speed around the person estimated by the wind speed estimator.

6. The air conditioner according to claim 4, further comprising:

a human position estimator
that includes a processor, and
that estimates a position of the person relative to the air conditioner based on the thermal image and a position of the infrared detector or the thermal camera inside the air-conditioned space; and
a wind temperature estimator that includes a processor
that estimates a wind temperature around the person in the air-conditioned space based on the position of the person estimated by the human position estimator and a blow temperature at the outlet port of the air conditioner, and
wherein the processor of the air conditioner estimates the human body thermal emission of the person by using the wind temperature around the person estimated as the ambient temperature.

7. The air conditioner according to claim 6, wherein
the processor of the wind temperature estimator estimates the wind temperature around the person based on the position of the person estimated by the human position estimator, and the blow temperature parameter set in the air conditioner, the blow temperature parameter prescribing a blow temperature at the outlet port of the air conditioner that blows air into the air-conditioned space to conduct air conditioning control.

8. The air conditioner according to claim 5, wherein
the human position estimator estimates the position of the person by using a position of the person's feet in the thermal image acquired, a height of the infrared detector or the thermal camera from a floor in the air-conditioned space, and an effective angular field of view of the infrared detector or the thermal camera.

9. The air conditioner according to claim 2, further comprising:

a temperature calculator
that includes a processor, and
that calculates a surface temperature of the person by using the thermal image, wherein
if the wind speed at the outlet port is varied, the human region temperature calculator uses a thermal image obtained from the infrared detector or the thermal camera before the variation in the wind speed at the outlet port and a thermal image obtained from the infrared detector or the thermal camera after the variation in the wind speed at the outlet port to calculate a surface temperature of the person before the variation and a surface temperature of the person after the variation, and
the wind speed estimator estimates the wind speed around the person in the air-conditioned space based on the surface temperature of the person before the variation and the surface temperature of the person after the variation.

10. The air conditioner according to claim 9, wherein the wind speed at the outlet port is varied by setting the blow parameter so as to prescribe the wind speed at the outlet port to zero, and after that, prescribe the wind speed at the outlet port to a certain speed.

11. The air conditioner according to claim 4, wherein the temperature calculator calculates the surface temperature of the person and the ambient temperature by using the thermal image.

12. The air conditioner according to claim 4, further comprising:
a received heat calculator
that includes a processor, and
that calculates a received heat, the received heat being an amount of heat that the person receives, wherein
the processor of the air conditioner estimates the human body thermal emission of the person by using the convective heat transfer coefficient calculated by the convective heat transfer coefficient calculator, an ambient temperature that is a temperature of regions other than the person in the air-conditioned space, the surface temperature of the person calculated by the temperature calculator, and the received heat calculated by the received heat calculator.

13. The air conditioner according to claim 12, wherein the received heat calculator includes
a sunlight intensity estimator
that includes a processor, and
that estimates a sunlight intensity on the person,
a sunlight area calculator
that includes a processor, and
that calculates a surface area of part of the person on which sunlight is incident, and
a received heat computer
that includes a processor, and
that calculates the received heat by using the sunlight intensity estimated by the sunlight intensity estimator, the surface area calculated by the sunlight area calculator, and a clothing absorption ratio of the person.

14. The air conditioner according to claim 4, wherein the temperature calculator calculates a temperature of the face or inside the face of the person as the surface temperature of the person.

15. The air conditioner according to claim 4, wherein the temperature calculator calculates a temperature of a femoral region of the person as the surface temperature of the person.

16. The air conditioner according to claim 4, wherein the temperature calculator calculates an average temperature of a region recognized as the person in the thermal image as the surface temperature of the person.

17. A thermal sensation estimation method of an air conditioner, comprising:
acquiring, as a thermal image at a direction of wind emitted from the air conditioner,
(i) a first thermal image including pixels indicating a temperature distribution inside an air-conditioned space with an infrared detector that detects a temperature within the air-conditioned space, wherein each of the pixels is associated with the infrared detector, or (ii) a second thermal image indicating the temperature distribution inside the air-conditioned space with a thermal camera that captures the air-conditioned space;
performing thermal emission estimation, by a processor included in the air conditioner, for estimating a human body thermal emission of a person in the air-conditioned space based on at least (i) the acquired thermal image including the person in the air-conditioned space and (ii) a wind speed of the wind emitted from the air conditioner with respect to a location of the person in the air-conditioned space;
performing thermal sensation estimation, by the processor included in the air conditioner, for estimating a thermal sensation of the person in the air-conditioned space based on the estimated human body thermal emission of the person in the air-conditioned space; and
controlling, by a controller included in the air conditioner, air conditioning of the air-conditioned space by controlling at least one of a compressor, a fan and a louver of the air conditioner to control at least one of a wind temperature, the wind speed and the wind direction to produce hot or cold air emitted from the air conditioner based on the thermal sensation of the person in the air-conditioned space.

18. A sensor system installed on board an air conditioner that conducts air conditioning control of an air-conditioned space based on a thermal sensation of a person in the air-conditioned space, the sensor system comprising:
at least one of an infrared detector or a thermal camera to acquire a thermal image at a direction of wind emitted from the air conditioner, (i) wherein the infrared detector is configured to detect a temperature within an air-conditioned space to acquire, as the thermal image, a first thermal image including pixels indicating a temperature distribution inside the air-conditioned space, wherein each of the pixels is associated with the infrared detector, or (ii) wherein the thermal camera is configured to capture the air-conditioned space to acquire, as the thermal image, a second thermal image indicating the temperature distribution inside the air-conditioned space;
a processor that estimates a human body thermal emission of the person in the air-conditioned space based on at least (i) the thermal image including the person in the air-conditioned space and (ii) a wind speed of the wind emitted from the air conditioner with respect to a location of the person in the air-conditioned space; that estimates a thermal sensation of the person in the air-conditioned space based on the estimated human body thermal emission of the person in the air-conditioned space; and
a controller that conducts air conditioning control of the air-conditioned space by controlling at least one of a compressor, a fan and a louver of the air conditioner to control at least one of a wind temperature, the wind speed and the wind direction to produce hot or cold air emitted from the air conditioner based on the thermal sensation of the person in the air-conditioned space.

19. The air conditioner according to claim 1, wherein the human body thermal emission of the person in the air-conditioned space and the thermal sensation of the person in the air-conditioned space are estimated by weighting a convective heat transfer coefficient and a wind temperature of the wind emitted from the air conditioner when the wind emitted from the air conditioner is blowing onto to the person, and weighting a convective heat transfer coefficient and the wind temperature when the wind emitted from the air conditioner is not blowing onto the person.

20. The air conditioner according to claim 1, wherein the thermal image changes based on a wind speed setting of the air conditioner.

* * * * *